US012692059B2

(12) United States Patent
Walcher et al.

(10) Patent No.: US 12,692,059 B2
(45) Date of Patent: Jul. 28, 2026

(54) ASSEMBLY FOR THE POSITIONING OF PHARMACEUTICAL CONTAINERS DURING FILLING OF SAID CONTAINERS

(71) Applicant: SCHOTT Pharma Schweiz AG, St. Gallen (CH)

(72) Inventors: Ulrich Walcher, St. Gallen (CH); Marcel Berlinger, St. Gallen (CH)

(73) Assignee: SCHOTT Pharma Schweiz AG, St. Gallen (CH)

( * ) Notice: Subject to any disclaimer, the term of this patent is extended or adjusted under 35 U.S.C. 154(b) by 0 days.

(21) Appl. No.: 19/172,841

(22) Filed: Apr. 8, 2025

(65) Prior Publication Data

US 2025/0318990 A1 Oct. 16, 2025

(30) Foreign Application Priority Data

Apr. 15, 2024 (EP) .................................... 24170196

(51) Int. Cl.
*B65D 71/70* (2006.01)
*A61J 1/16* (2023.01)

(52) U.S. Cl.
CPC ................ *B65D 71/70* (2013.01); *A61J 1/16* (2013.01); *B01L 2200/021* (2013.01); *B01L 2200/025* (2013.01); *B01L 2200/028* (2013.01); *B01L 2200/12* (2013.01)

(58) Field of Classification Search
CPC ...... B67D 71/70; A61J 1/16; B01L 2200/021; B01L 2200/025; B01L 2200/028; B01L 2200/12; B01L 9/06
See application file for complete search history.

(56) References Cited

U.S. PATENT DOCUMENTS 4,124,122 A * 11/1978 Emmitt ..................... B01L 9/06 422/561
9,776,188 B1 * 10/2017 Kamees .................... B01L 9/50
10,011,381 B2 * 7/2018 Deutschle ............ B65D 51/241
11,679,905 B1 * 6/2023 Ellis ........................ B65B 43/59 141/1
11,744,294 B2 * 9/2023 Kwon ..................... A24F 15/01 131/328

(Continued)

FOREIGN PATENT DOCUMENTS

EP 3381828 A1 * 10/2018 ............ A61M 5/008
WO WO2019030782 A1 2/2019

*Primary Examiner* — Nicolas A Arnett
(74) *Attorney, Agent, or Firm* — Davidson Kappel LLC

(57) ABSTRACT

An assembly has a first structure and a further structure. The first structure includes a first plurality of receptacles for at least partially accommodating a plurality of containers, and that have a first end and a further end. The further structure includes a further plurality of receptacles for at least partially accommodating the plurality of containers and has a first surface and a further surface, opposite the first surface. A force is exerted along a further direction on the containers when the containers are being inserted into and/or removed from the further structure along a first direction. The structures are positioned such that an average distance between the further ends of the first plurality of receptacles and the first surface of the further structure is less than 5 cm, and the first plurality of receptacles is at least partially aligned with the further plurality of receptacles.

14 Claims, 8 Drawing Sheets

(56) References Cited

U.S. PATENT DOCUMENTS

| | | | | |
|---|---|---|---|---|
| 2005/0236346 | A1* | 10/2005 | Whitney | B01L 9/06<br>211/74 |
| 2012/0328489 | A1* | 12/2012 | Beese | B65D 25/108<br>422/526 |
| 2015/0108034 | A1* | 4/2015 | Deutschle | A61J 1/16<br>206/593 |
| 2017/0183113 | A1* | 6/2017 | Deutschle | G01G 17/06 |
| 2019/0343721 | A1* | 11/2019 | Komann | A61J 1/16 |
| 2022/0097939 | A1* | 3/2022 | Komann | B65D 11/14 |
| 2022/0227566 | A1* | 7/2022 | Nau | B65B 7/2821 |
| 2025/0318989 | A1* | 10/2025 | Berlinger | A61J 1/16 |

* cited by examiner

ASSEMBLY FOR THE POSITIONING OF PHARMACEUTICAL CONTAINERS DURING FILLING OF SAID CONTAINERS

This claims priority to European Patent Application EP 24170196.0, filed on Apr. 15, 2024 which is hereby incorporated by reference herein.

The invention pertains to an assembly comprising a first structure and a further structure that are adapted and arranged for the positioning of a plurality of containers.

BACKGROUND

Containers, such as containers for pharmaceutical and/or cosmetic compositions, are generally accommodated and transported using first structures known as nests, such as the nests commercially available from SCHOTT Pharma AG & Co. KGaA. A container very often has a varying diameter. For example, the container may be a syringe with a cap, wherein a barrel of the syringe has a different diameter compared to a diameter of the cap. Therefore, the receptacles in the nest must be dimensioned such that containers with varying diameters can still be accommodated in the nest. In general, this requires that a maximum diameter of the container should be smaller than a diameter of a receptacle. If a receptacle has ribs or projections extending into an interior of said receptacle, the maximum diameter of the container should also be small enough to fit between any such ribs or projections. However, this leads to the containers tilting in the nest, which in turn leads to problems during the filling of the containers while said containers are accommodated in the nest. Examples of such problems include a varying fill height of the containers, and damage to the fill needles as a result of said needles coming into contact with the containers.

US20050236346 discloses a rack for test tubes with central and lower support panels. U.S. Pat. Nos. 4,124,122A and 9,776,188 disclose a rack for test tubes with a base, comprising apertures, and at least one support plate spaced apart from the base. WO2019030782A1 discloses a container that can comprise at least two trays. US20120328489 discloses a device for holding pipettes, the device comprising a perforated plate and a container, arranged below said plate, for accommodating the tips of the pipettes.

SUMMARY OF THE INVENTION

An object of the present invention is to at least partially overcome at least one of the disadvantages encountered in the state of the art.

It is a further object of the invention to provide an assembly that allows for an easier insertion into and/or removal from said assembly.

It is a further object of the invention to provide an assembly that allows for an improved positioning of a plurality of containers when said containers are being accommodated and/or are accommodated in said assembly, preferably for the at least partial filling of said containers with a pharmaceutical and/or cosmetic composition.

It is a further object of the invention to provide an assembly that allows for a reduction in tilt of a plurality of containers when said containers are being accommodated and/or are accommodated in said assembly, preferably for the at least partial filling of said containers with a pharmaceutical and/or cosmetic composition.

It is a further object of the invention to provide an assembly that has an improved stability, preferably during the at least partial filling of a plurality of containers accommodated in said assembly.

It is a further object of the invention to provide an assembly that allows for a faster filling of a plurality of containers, accommodated in said assembly, with a pharmaceutical and/or cosmetic composition.

It is a further object of the invention to provide an assembly that reduces a loss of a pharmaceutical and/or cosmetic composition during the filling of a plurality of containers with said composition, and wherein said containers are accommodated in said assembly.

It is a further object of the invention to provide an assembly that has a larger tolerance for a positioning of a device, for the filling of a plurality of containers, when said containers are accommodated in the assembly.

It is a further object of the invention to provide an assembly that reduces the contamination of a pharmaceutical and/or cosmetic composition accommodated charged in a plurality of containers, wherein said containers are accommodated in said assembly.

It is a further object of the invention to provide an assembly that reduces damage during the accommodating of a plurality of containers in said assembly.

It is a further object of the invention to provide an assembly that can receive a plurality of containers, wherein said containers have a non-uniform diameter, for the at least partial filling of said containers with a pharmaceutical and/or cosmetic composition.

Preferred Embodiments of the Invention

A contribution to at least partially fulfilling at least one of the above-mentioned objects is made by any of the embodiments of the invention.

A $1^{st}$ embodiment of the invention is an assembly comprising a first structure and a further structure, wherein

- a. the first structure comprises a first plurality of receptacles
  - i. that are adapted and arranged for at least partially accommodating a plurality of containers, wherein said containers are preferably for pharmaceutical or cosmetic compositions,
  - ii. that have a first end and a further end, opposite the first end;
- b. the further structure
  - i. comprises a further plurality of receptacles that are adapted and arranged for at least partially accommodating the plurality of containers,
  - ii. has a first surface and a further surface, opposite the first surface,
  - iii. comprises
    - A. either a first plurality of protrusions extending from the first surface, or a further plurality of protrusions extending from the further surface, or both,
    - B, wherein the first plurality of protrusions, the further plurality of protrusions, or both, are adapted and arranged to exert a force along a further direction on the containers when said containers are being inserted into and/or removed from the further structure along a first direction, wherein
      - I. the first direction is perpendicular to the first surface of the further structure, and II. an angle $\alpha$ between the first direction and the further direction is such that $\alpha>0°$;

c. the first structure and the further structure are adapted and arranged to be positioned such that i. an average distance between the further ends of the first plurality of receptacles and the first surface of the further structure is less than 5 cm, preferably less than 3 cm, more preferably less than 1 cm, and further preferably 0 cm, ii. the first plurality of receptacles is at least partially aligned with the further plurality of receptacles.

In the 1st embodiment, if the average distance between the further ends of the first plurality of receptacles and the first surface of the further structure is 0 cm this should preferably be understood to mean that at least a part of the further ends of the receptacles, of the first plurality of receptacles, are in contact with the first surface of the further structure. In the 1st embodiment, it is preferred that the force is exerted when a container is in contact with the at least protrusion, more preferably when said container is being inserted into and/or removed from the further structure. In the 1st embodiment, it is preferred that the force results in a change in the direction of motion of at least one section of a container, when said section of the container is being inserted into and/or removed from the further structure. In the 1st embodiment, it is preferred that the containers have a maximum diameter that is less than a minimum diameter of the first plurality of receptacles, the further plurality of receptacles, or both. In the 1st embodiment, it is preferred that the first plurality of protrusions exert the force on the containers when said containers are being inserted into the further structure. In the 1st embodiment, it is preferred that the further plurality of protrusions exert the force on the containers when said containers are being removed from the further structure. In a preferred aspect of the 1st embodiment, it is preferred that the receptacles are adapted and arranged for accommodating a plurality of containers, wherein each container, of the plurality of containers, has a first section and a further section, and wherein a diameter of the further section is larger than a diameter of the first section. In this aspect, it is preferred that the further section is a body of the container, and the further section is a closing means adapted and arranged to close the container. In this aspect, it is preferred that the first section is a barrel of a syringe, and the further section is a cap of the syringe.

In a preferred embodiment of the assembly, the first structure and the further structure are adapted and arranged to be detachably engaged. This preferred embodiment is a 2nd embodiment of the invention, that preferably depends on the 1st embodiment of the invention.

In a preferred embodiment of the assembly, the angle $\alpha$ is in the range from 20° to 170°, preferably from 50° to 130°, more preferably from 70° to 110°, even more preferably from 80° to 100°, and further preferably 90°. This preferred embodiment is a 3rd embodiment of the invention, that preferably depends on any of the 1st to 2nd embodiments of the invention.

In a preferred embodiment of the assembly, the first structure comprises a first surface and a further surface, opposite the first surface, wherein the first structure and the further structure are adapted and arranged to be positioned such that a distance between the further surface of the first structure and the first surface of the further structure is less than 5 cm, preferably less than 3 cm, more preferably less than 1 cm, and further preferably 0 cm. This preferred embodiment is a 4th embodiment of the invention, that preferably depends on any of the 1st to 3rd embodiments of the invention. In the 4th embodiment, if the distance between the further surface of the first structure and the first surface of the further structure is 0 cm this should be understood to mean that the further surface of the first structure is in contact with the first surface of the further structure.

In a preferred embodiment of the assembly, the assembly comprises the first plurality of protrusions extending from the first surface of the first structure, and wherein the first structure and the further structure a. are adapted and arranged for the protrusions to be at least partially received in the first structure, b, wherein, if the protrusions are at least partially received in the first structure, i. the first plurality of receptacles is at least partially aligned with the further plurality of receptacles, and ii. preferably, the further ends of the first plurality of receptacles are in contact with the first surface of the further structure.

This preferred embodiment is a 5th embodiment of the invention, that preferably depends on any of the 1st to 4th embodiments of the invention. In a preferred aspect of the 5th embodiment, the plurality of protrusions are received in the first structure. In the 5th embodiment, if the further ends of the receptacles, of the first plurality of receptacles, are in contact with the first surface of the further structure, this should preferably be understood to mean that at least a part of the further ends of the receptacles, of the first plurality of receptacles, are in contact with the first surface of the further structure.

In a preferred embodiment of the assembly, the first structure comprises a plurality of recesses adapted and arranged for at least partially receiving the first plurality of protrusions. This preferred embodiment is a 6th embodiment of the invention, that preferably depends on the 5th embodiment of the invention. In a preferred aspect of the 6th embodiments, the first structure comprises a first surface and a further surface, opposite the first surface, wherein the recesses are arranged in said further surface.

In a preferred embodiment of the assembly, if the first plurality of protrusions are received in the recesses, gaps are formed between said protrusions and the sidewalls of the first plurality of receptacles. This preferred embodiment is a 7th embodiment of the invention, that preferably depends on the 6th embodiment of the invention. In a preferred aspect of the 7th embodiment, the gaps are formed between the tops of the protrusions and the sidewalls of the first plurality of receptacles. Here a top of a protrusion is defined as the part of the protrusion furthest from the first surface of the further structure.

In a preferred embodiment of the assembly, the recesses are formed in sidewalls of the receptacles, of the first plurality of receptacles. This preferred embodiment is an 8th embodiment of the invention, that preferably depends on any of the 6th to 7th embodiments of the invention.

In a preferred embodiment of the assembly, the assembly, more preferably the first structure, is adapted and arranged for the first plurality of protrusions to be detachably received in the first structure. This preferred embodiment is a 9th embodiment of the invention, that preferably depends on any of the 5th to 8th embodiments of the invention.

In a preferred embodiment of the assembly, if the first plurality of protrusions are received in the first structure, one of the following applies:

a. an average distance between the first plurality of receptacles and the first plurality of protrusions is larger than 0 mm, preferably larger than or equal to 0.1 mm, and more preferably larger than or equal to 0.5 mm; or b. the first plurality of protrusions touches the first structure, more preferably touches sidewalls of the first plurality of receptacles.

This preferred embodiment is a $10^{th}$ embodiment of the invention, that preferably depends on any of the $5^{th}$ to $9^{th}$ embodiments of the invention. In a preferred aspect of the $10^{th}$ embodiment, feature a., the average distance between the first plurality of receptacles and the first plurality of protrusions is 5 mm or less, more preferably 2 mm or less, and further preferably 1 mm or less. In the $10^{th}$ embodiment, feature a., the average distance is measured along a direction that is perpendicular to the first surface of the further structure. In a preferred aspect of the $10^{th}$ embodiment, feature a., the average distance is measured between the sidewalls of the first plurality of receptacles and the first plurality of protrusions.

In a preferred embodiment of the assembly, the assembly is adapted and arranged for the first plurality of protrusions to be at least partially received in the first plurality of receptacles, preferably such that said protrusions extend into the interiors of said receptacles. This preferred embodiment is an $11^{th}$ embodiment of the invention, that preferably depends on any of the $5^{th}$ to $10^{th}$ embodiments of the invention.

In a preferred embodiment of the assembly, the first plurality of protrusions are adapted and arranged to constrain a movement of the first structure in at least one dimension, preferably a lateral direction. This preferred embodiment is an $12^{th}$ embodiment of the invention, that preferably depends on any of the $5^{th}$ to $11^{th}$ embodiments of the invention. In a preferred aspect of the $12^{th}$ embodiment, the movement of the first structure is constrained to be 10 mm or less, more preferably 5 mm or less, and further preferably 3 mm or less. In a preferred aspect of the $12^{th}$ embodiment, the first plurality of protrusions are adapted and arranged to allow for a movement of the first structure of a least 0.5 mm, preferably at least 1 mm, more preferably at least 2 mm in the lateral direction. In the $12^{th}$ embodiment, it should not be understood that the first structure is necessarily constrained such that the first structure is immovable. In a preferred aspect of the $12^{th}$ embodiment, the first structure is constrained such that the first structure can move a distance that is in the range from 0.2 to 3 mm, more preferably from 0.3 to 2 mm, even more preferably from 0.4 to 1 mm, and further preferably from 0.5 to 0.7 mm.

In a preferred embodiment of the assembly, each receptacle, of the further plurality of receptacles, has in the range from 2 to 12, preferably from 3 to 10, more preferably from 4 to 8, and further preferably from 5 to 7 protrusions arranged at least partially around a circumference of the respective receptacle. This preferred embodiment is a $13^{th}$ embodiment of the invention, that preferably depends on any of the $1^{st}$ to $12^{th}$ embodiments of the invention. In the $13^{th}$ embodiment, the protrusions can be protrusions of the first plurality of protrusions, or protrusions from the further plurality of protrusions, or both.

In a preferred embodiment of the assembly, sidewalls of the receptacles, of the first plurality of receptacles, comprise protuberances extending into the interiors of said receptacles. This preferred embodiment is a $14^{th}$ embodiment of the invention, that preferably depends on any of the $1^{st}$ to $13^{th}$ embodiments of the invention.

In a preferred embodiment of the assembly, if the first plurality of protrusions are received in the first structure, the protuberances are arranged between said protrusions. This preferred embodiment is a $15^{th}$ embodiment of the invention, that preferably depends the $14^{th}$ embodiment of the invention., when the $14^{th}$ embodiment in turn depends on any of the $5^{th}$ to $13^{th}$ embodiments of the invention. In a preferred aspect of the $15^{th}$ embodiment, a movement of the protuberances is constrained in the lateral direction by being arranged between said protrusions. In this aspect, it is preferred that the movement of the protuberances is constrained to be 10 mm or less, more preferably 5 mm or less, and further preferably 3 mm or less. In this aspect, it is preferred that the first plurality of protrusions are adapted and arranged to allow for a movement of the protuberances of a least 0.5 mm, more preferably at least 1 mm, and further preferably at least 2 mm in the lateral direction.

In a preferred embodiment of the assembly, the protuberances have at least one of the following geometric shapes: cubic, cylindrical, half-cylindrical, a prism, such as a triangular prism, a trapezoidal prism, a cone, a pyramid, spherical, half-spherical, a combination of at least two thereof. This preferred embodiment is a $16^{th}$ embodiment of the invention, that preferably depends on any of the $14^{th}$ to $15^{th}$ embodiments of the invention. It is not required that the protuberances all have the same shape. For example, some of the protuberances may have a cylindrical shape, while the remaining protuberances have a conical shape.

In a preferred embodiment of the assembly, the first plurality of protrusions, or the further plurality of protrusions, or both, are arranged at least partially around circumferences of the receptacles, of the further plurality of receptacles, and preferably wherein an average distance between the protrusions and said circumferences is less than 2 mm, more preferably less than 1 mm, preferably less than 0.5 mm, and further preferably less than 0.2 mm. This preferred embodiment is a $17^{th}$ embodiment of the invention, that preferably depends on any of the $1^{st}$ to $16^{th}$ embodiments of the invention. In the $17^{th}$ embodiment, the wording "the protrusions" should be understood to refer to either the first plurality of protrusions, the further plurality of protrusions, or both.

In a preferred embodiment of the assembly, the first plurality of protrusions, or the further plurality of protrusions, or both, comprise surfaces that are arranged at an angle $\beta$ with respect to the first surface of the further structure, wherein said angle $\beta$ is less than 90°, preferably $\beta$ is in the range from 10° to 80°, more preferably from 30° to 70°, and further preferably from 45° to 60°. This preferred embodiment is an $18^{th}$ embodiment of the invention, that preferably depends on any of the $1^{st}$ to $17^{th}$ embodiments of the invention.

In a preferred embodiment of the assembly, at least one or all of the following applies to the first plurality of protrusions, or the further plurality of protrusions, or both:

a. an average height of the protrusions is less than or equal to a height of the first structure, preferably smaller than the height of the first structure;

b. an average height of the protrusions is in the range from 0.5 mm to 20 mm, preferably from 0.5 to 16 mm, more preferably from 1 to 12 mm, even more preferably from 1 to 8 mm, further preferably from 1.5 to 6 mm, further preferably from 1.5 to 4 mm, and even further preferably from 1.8 to 3 mm.

This preferred embodiment is a $19^{th}$ embodiment of the invention, that preferably depends on any of the $1^{st}$ to $18^{th}$ embodiments of the invention. In the $19^{th}$ embodiment, the wording "the protrusions" should be understood to refer to either the first plurality of protrusions, the further plurality of protrusions, or both. In an aspect of the $19^{th}$ embodiment, all possible combination of the features a. and b. are preferred aspects of the embodiment. These combinations are, e.g., a; b; a+b.

In a preferred embodiment of the assembly, the upper parts of the first plurality of protrusions, or the further plurality of protrusions, or both, are narrower that the lower parts of the protrusions, wherein the lower parts are arranged closer to the first surface of the further structure than the upper parts. This preferred embodiment is a 20$^{th}$ embodiment of the invention, that preferably depends on any of the 1$^{st}$ to 19$^{th}$ embodiments of the invention. In the 20$^{th}$ embodiment, the wording “the protrusions” should be understood to refer to either the first plurality of protrusions, the further plurality of protrusions, or both.

In a preferred embodiment of the assembly, the first plurality of protrusions, the further plurality of protrusions, or both, have at least one of the following geometric shapes: cubic, cylindrical, half-cylindrical, a prism, such as a triangular prism, a trapezoidal prism, a cone, a pyramid, spherical, half-spherical, a combination of at least two thereof. This preferred embodiment is a 21$^{st}$ embodiment of the invention, that preferably depends on any of the 1$^{st}$ to 20$^{th}$ embodiments of the invention. It is not required that the protrusions, of a plurality of protrusions (e.g., the first plurality, the further plurality), all have the same shape. For example, some of the protrusions (of the first plurality of protrusions) may have a pyramid shape, while the remaining protrusions (of the first plurality of protrusions) have a cylindrical shape.

In a preferred embodiment of the assembly, the first plurality of protrusions, the further plurality of protrusions, or both, are arranged around the circumferences of the receptacles, of the further plurality of receptacles, and wherein said protrusions have an average diameter that is in the range from 1.01 to 1.8, preferably from 1.1 to 1.6, and more preferably from 1.2 to 1.4 times larger than an average diameter of the receptacles, of the further plurality of receptacles. This preferred embodiment is a 22$^{nd}$ embodiment of the invention, that preferably depends on any of the 1$^{st}$ to 21$^{st}$ embodiments of the invention.

In a preferred embodiment of the assembly, the first plurality of receptacles have a first average diameter $D_1$ and the further plurality of receptacles have an further average diameter $D_2$, and wherein one of the following applies:

a. $D_1$ is larger than $D_2$;

b. $D_2$ is less than $D_1$;

c. $D_1$ and $D_2$ vary by less than 5%, preferably less than 3%, and more preferably less than 1.5%.

This preferred embodiment is a 23$^{rd}$ embodiment of the invention, that preferably depends on any of the 1$^{st}$ to 22$^{nd}$ embodiments of the invention. In a preferred aspect of the 23$^{rd}$ embodiment, feature a., $D_1$ larger than $D_2$ by in the range from 5% to 25%, more preferably from 5% to 20%, even more preferably 5% to 15%, and further preferably from 5% to 10%. In a preferred aspect of the 23$^{rd}$ embodiment, feature b., $D_2$ larger than $D_1$ by in the range from 5% to 25%, more preferably from 5% to 20%, even more preferably 5% to 15%, and further preferably from 5% to 10%. In the 23$^{rd}$ embodiment, features a. and c. are more preferred.

In a preferred embodiment of the assembly, at least one or all of the following applies:

a. an average distance between centres of neighbouring receptacles, of the first plurality of receptacles, is in the range from 8 to 60 mm, preferably from 10 to 55 mm, and further preferably from 12 to 50 mm;

b. an average distance between centres of neighbouring receptacles, of the further plurality of receptacles, is in the range from 8 to 60 mm, preferably from 10 to 55 mm, and further preferably from 12 to 50 mm.

This preferred embodiment is a 24$^{th}$ embodiment of the invention, that preferably depends on any of the 1$^{st}$ to 23$^{rd}$ embodiments of the invention. In an aspect of the 24$^{th}$ embodiment, all possible combination of the features a. and b. are preferred aspects of the embodiment. These combinations are e.g., a; b; a+b.

In a preferred embodiment of the assembly, at least one or all of the following applies:

a. an average diameter of the first plurality of receptacles is in the range from 6 to 55 mm, preferably from 6 to 50 mm, more preferably from 8 to 45 mm, even more preferably from 9 to 40 mm, and further preferably from 9.2 to 35 mm;

b. an average diameter of the further plurality of receptacles is in the range from 6 to 55 mm, preferably from 6 to 50 mm, more preferably from 8 to 45 mm, even more preferably from 9 to 40 mm, and further preferably from 9.2 to 35 mm.

This preferred embodiment is a 25$^{th}$ embodiment of the invention, that preferably depends on any of the 1$^{st}$ to 24$^{th}$ embodiments of the invention. In an aspect of the 25$^{th}$ embodiment, all possible combination of the features a. and b. are preferred aspects of the embodiment. These combinations are e.g., a; b; a+b.

In a preferred embodiment of the assembly, the first structure has a height $H_1$ and the further structure has a height $H_2$, and wherein $H_1 \backslash H_2$ is in the range of 1 to 4, preferably from 1.2 to 3, more preferably from 1.5 to 2.5, and further preferably from 1.7 to 2.2. This preferred embodiment is a 26$^{th}$ embodiment of the invention, that preferably depends on any of the 1$^{st}$ to 25$^{th}$ embodiments of the invention.

In a preferred embodiment of the assembly, the following applies to the first structure, the further structure, or both: a height of the structure is less than a width and a length of the structure. This preferred embodiment is a 27$^{th}$ embodiment of the invention, that preferably depends on any of the 1$^{st}$ to 26$^{th}$ embodiments of the invention. In the 27$^{th}$ embodiment, the wording “the structure” should be understood to refer to either the first structure, the further structure, or both.

In a preferred embodiment of the assembly, the height $H_2$ of the further structure is in the range from 5 to 35 mm, more preferably from 7 to 25 mm, and further preferably from 9 to 15 mm. This preferred embodiment is a 28$^{th}$ embodiment of the invention, that preferably depends on any of the 1$^{st}$ to 27$^{th}$ embodiments of the invention.

A 29$^{th}$ embodiment of the invention is an assembly according to the invention, preferably an assembly according to any of the 1$^{st}$ to 28$^{th}$ embodiments of the invention, further comprising a plurality of containers that contain less than 0.1 ml, preferably less than 0.05 ml, and further preferably less than 0.01 ml of a composition.

In a preferred aspect of the 29$^{th}$ embodiment, each container, of the plurality of containers, has a first section and a further section, wherein a diameter of the further section is larger than a diameter of the first section. In this aspect it is preferred that the further section is a body of the container, and the further section is a closing means adapted and arranged to close the container. For example, the first section is a barrel of a syringe, and the further section is a cap of the syringe.

A 30$^{th}$ embodiment of the invention is an assembly according to the invention, preferably an assembly according to any of the $1^{st}$ to $28^{th}$ embodiments of the invention, further comprising a plurality of containers that are at least 20%, preferably at least 35%, and more preferably at least 50%, filled with a composition. In the $30^{th}$ embodiment, the percentage values given are with respect to a nominal volume of the containers.

In a preferred aspect of the $30^{th}$ embodiment, each container, of the plurality of containers, has a first section and a further section, wherein a diameter of the further section is larger than a diameter of the first section. In this aspect it is preferred that the further section is a body of the container, and the further section is a closing means adapted and arranged to close the container. For example, the first section is a barrel of a syringe, and the further section is a cap of the syringe.

A $31^{st}$ embodiment of the invention is a method for at least partially filling a plurality of containers, comprising the steps of a. providing a first structure of an assembly according to the invention, preferably the assembly according to any of the $1^{st}$ to $29^{th}$ embodiments of the invention, with a plurality of containers at least partially accommodated in the first plurality of receptacles;
b. providing a further structure of the assembly according to the invention, preferably the assembly according to any of the $1^{st}$ to $29^{th}$ embodiments of the invention;
c. engaging the first structure and the further structure, preferably by allowing the plurality of protrusions to be received in the first structure, thereby resulting in
    i. the plurality of containers at least partially accommodated in the further plurality of receptacles, and
    ii. an average distance between the further ends of the first plurality of receptacles and the first surface of the further structure being less than 5 cm, preferably less than 3 cm, more preferably less than 1 cm, and further preferably 0 cm;
d. at least partially filling the containers.

In the $31^{st}$ embodiment, if the average distance between the further ends of the first plurality of receptacles and the first surface of the further structure is 0 cm this should preferably be understood to mean that at least a part of the further ends of the receptacles, of the first plurality of receptacles, are in contact with the first surface of the further structure.

In a preferred embodiment of the method for at least partially filling a plurality of containers, during the engagement of the first structure and the further structure (step c. in the $31^{st}$ embodiment of the invention), the further structure is moved in an alternating fashion, more preferably in a direction that is perpendicular to the first direction. This preferred embodiment is a $32^{nd}$ embodiment of the invention, that preferably depends on the $31^{st}$ embodiment of the invention. Examples of the further structure being moved in an alternating fashion include shaking the further structure, moving the further structure back and forth, an oscillating movement of the further structure.

In a preferred embodiment of the method for at least partially filling a plurality of containers, at least one or all of the following applies to the movement of the further structure in the alternating fashion:

a. an amplitude of the movement of the further structure is 2 mm or less, preferably 1 mm or less, and further preferably 0.5 mm or less;
b. the further structure is moved for a duration of 2 seconds or less, preferably 1 second or less, and further preferably 0.5 seconds or less;
c. the further structure is moved at a frequency that is at least 5 Hz, preferably at least 15 Hz, and further preferably at least 50 Hz.

This preferred embodiment is a $33^{rd}$ embodiment of the invention, that preferably depends on the $32^{nd}$ embodiment of the invention. In an aspect of the $33^{rd}$ embodiment, all possible combination of the features a. to c. are preferred aspects of the embodiment. These combinations are e.g., a; b; c; a+b; a+c; b+c; a+b+c.

A $34^{th}$ embodiment of the invention is a plurality of containers at least partially filed with a composition, obtainable according to a method of the invention for filling a plurality of containers, preferably the method according to any of the $31^{st}$ to $33^{rd}$ embodiments of the invention.

A $35^{th}$ embodiment of the invention is a use of an assembly comprising a first structure and a further structure that are detachably engaged, and preferably touching each other, for the at least partial filling of a plurality of containers at least partially accommodated in the first structure and the further structure. In a preferred aspect of the $35^{th}$ embodiment, the first and further structure form part of an assembly according to the invention, more preferably an assembly according to any of the $1^{st}$ to $29^{th}$ embodiments of the invention.

A $36^{th}$ embodiment of the invention is a use of an assembly according to the invention, preferably an assembly according to any of the $1^{st}$ to $29^{th}$ embodiments of the invention, for the at least partial filling of containers at least partially accommodated in the first structure and the further structure.

DETAILED DESCRIPTION OF THE INVENTION

Features described as preferred in one category of the invention, for example according to the assembly, are analogously preferred in an embodiment of the other categories according to the invention, such as a process according to the invention.

Throughout this document, disclosures of ranges should preferably be understood to include both end points of the range. Furthermore, each disclosure of a range in the document should preferably be understood as also disclosing preferred sub-ranges in which one end point is excluded or both end points are excluded. For example, a disclosure of a range from $X_1$ to $X_2$ is to be understood as disclosing a range that includes both of the end points $X_1$ and $X_2$. Further-more, it is to be understood as also disclosing a range that includes the end point $X_1$ but excludes the end point $X_2$, a range that excludes the end point $X_1$ but includes the end point $X_2$, and a range that excludes both end points $X_1$ and $X_2$.

Some preferred embodiments and preferred aspects have various combinations of features as alternatives. If the various combinations are disclosed, these combinations are separated by a semi-colon (";"). For example, the list of features "a; a+b; a+c+d" for a preferred embodiment discloses a preferred embodiment that comprises the feature "a", a preferred embodiment that comprises the features "a" and "b", and a preferred embodiment that comprises the features "a", "c", and "d".

Preferred embodiments and preferred aspects disclosed for a structure should be understood to be preferred embodiments and preferred aspects of both the first structure and the further structure. Preferred embodiments and preferred aspects disclosed for a receptacle should be understood to be preferred embodiments and preferred aspects of both receptacles of the first structure and receptacles of the further structure. Preferred embodiments and preferred aspects disclosed for the protrusions should be understood as preferred embodiments and preferred aspects of the both the first plurality of protrusions and the further plurality of protrusions.

In an embodiment of the invention, the further structure comprises a first plurality of protrusions and/or a further plurality of protrusions. This should not be understood to means that the further structure can only have the first plurality of protrusions and/or a further plurality of protrusions. For example, the further structure may also have a second plurality of protrusions that have some of the features of the first plurality of protrusions and/or a further plurality of protrusions. For example, the further structure comprises a first plurality of protrusions that extend from the first surface of the further structure, wherein said protrusions, of the first plurality of protrusions, each have a surface that is arranged at an angle of 50° with respect to the first surface of the further structure. Here the further structure may also comprise other protrusions that extend from the first surface of the further structure, but which do not have a surface that is arranged at an angle of 50° with respect to the first surface of the further structure. These other protrusions for a second plurality pf protrusions. The above also applies, mutatis mutandis, to the other features of the first structure and the further structure. Here the other features include the first plurality of receptacles, the further plurality of receptacles, the protuberances, and the recesses.

The invention is now illustrated by non-limiting examples and exemplifying embodiments.

Structure

A structure (e.g., the first structure, the further structure) preferably comprises a polymer. Examples of a preferred polymer include polypropylene, polyoxymethylene, polyethylene, polyethylene terephthalate, polystyrene, a cyclic olefin copolymer (COC) and a cyclic olefin polymer (COP). Here polypropylene is particularly preferred for the first structure. Here polyoxymethylene is particularly preferred for the further structure. A structure may be obtained using deep drawing moulding, preferably injection moulding, and/or 3D printing.

A further structure preferably comprises a metal and/or at least one polymer, preferably at least one temperature resistant polymer. Examples of a preferred metal include stainless steel and a non-rusting steel. Here stainless steel is particularly preferred. A temperature resistant polymer should preferably be understood as a polymer that is resistant to damage when exposed to temperatures used for sterilisation of a structure, wherein said sterilisation is preferably performed using a gas and/or vapour (the sterilisation of a structure is often performed at a temperature of 121° C.). A preferred example of a temperature resistant polymer is polyether ether ketone (PEEK). A further structure more preferably comprises a polymer and a metal.

A first structure may, generally, be any structure and/or device which the skilled person would deem suitable for accommodating a plurality of containers. Examples of a first structure is a nest for holding containers, wherein said containers are, in turn, for accommodating pharmaceutical and/or cosmetic compositions. Here "nest" should preferably be understood as used in the pharmaceutical industry.

A further structure is preferably adapted and arranged to improve a centring of containers accommodated and/or being accommodated in a first structure.

In one preferred aspect of the invention, a first structure is manufactured as a single piece. In one preferred aspect of the invention, the further structure is manufactured as a single piece. In another preferred aspect of the invention, the further structure is manufactured as two pieces, i.e., comprises two pieces. In this aspect, the further structure preferably comprises a core and an outer layer at least partially surrounding the core. Here it is preferred that the core is removable from the outer layer. In this aspect, the core preferably comprises a polymer, such as polyoxymethylene, while the outer layer preferably comprises a metal, such as stainless steel. The first structure and the further structure are preferably manufactured as separate pieces.

A first structure preferably comprises 5 to 250, more preferably 10 to 200, even more preferably 20 to 190, further preferably 40 to 180, further preferably 60 to 180, further preferably 80 to 180, and even further preferably 100 to 160, receptacles. A further structure preferably comprises 5 to 250, more preferably 10 to 200, even more preferably 20 to 190, further preferably 40 to 180, further preferably 60 to 180, further preferably 80 to 180, and even further preferably 100 to 160, receptacles. A preferred assembly comprises a first structure and a further structure that has the same number of receptacles.

In a preferred aspect of the invention, the assembly further comprises an even-further structure. This even-further structure preferably comprises at least one metal and/or at least one polymer, as described for the first structure and the further structure above. In a preferred aspect of the invention, the even-further structure comprises a first surface that is adapted and arranged for placing the further structure on said first surface of the even-further structure. In a preferred aspect of the invention, the even-further structure comprises an even-further plurality of receptacles that are adapted and arranged for at least partially accommodating a plurality of containers. The even-further structure preferably comprises a number of receptacles as described for the first structure and the further structure above.

Surfaces of a Structure

The first surface and the further surface of a structure are preferably arranged parallel to each other. It is not required that a surface of a structure is continuous. For example, the first structure has an upper surface with the sidewalls of the receptacles, of the first plurality of receptacles, extending away from the first surface. Furthermore, the sidewalls of the receptacles do not teach each other. In this example the lower surface of the first structure is at least partially formed by the further ends of said receptacles. In this example, the lower surface may also include a surface that is arranged at the same height as the lower ends of said receptacles, wherein said surface is arranged around said receptacles and perpendicular to the lengths of said receptacles.

Receptacles

A container that is partially accommodated in a receptacle should preferably be understood to mean that a first section of the container is located in the interior of said receptacle, while a further section of the container is not located in the interior of said receptacle, i.e., the further section of the container extends beyond the receptacle in which said container is located. Here a first section of the container located in the receptacle may be, e.g., a section of the container that includes an end of the container, or a section of the container located between two ends of the container, wherein said first section excludes the ends of the container. A container that is accommodated in a receptacle should preferably be understood to mean that no section of said container extends beyond an interior of said receptacle.

A receptacle that is adapted and arranged for at least partially accommodating a container should be understood to mean that said receptacle is also adapted and arranged for holding said container. E.g., if a container is accommodated in a receptacle, this should be understood to mean that the container is held in the receptacle. If a container is being accommodated in a receptacle, this should preferably be understood to refer to the container being inserted into the receptacle and/or the container being removed from the receptacle.

A receptacle according to the invention preferably comprises a sidewall enclosing an interior of the receptacle. A receptacle according to the invention comprises at least one opening through which a container can inserted into and/or removed from said receptacle. If a receptacle has two openings, a first opening and a further opening, it is preferred that the receptacle is adapted and arranged such that a container accommodated in said receptacle extends beyond the first opening and/or the further opening. E.g., only a section located between a first end and a further end of the container is surrounded by a sidewall of the receptacle. If a receptacle has only one opening for inserting and/or removing a container, it is preferred that the receptacle is adapted and arranged such that, if a container is accommodated in said receptacle, an end of the container is accommodated in said receptacle. A preferred receptacle is elongated.

In a preferred aspect of the invention, the receptacles, of first plurality of receptacles (of the first structure), each have two openings. In a preferred aspect of the invention, the receptacles, of further plurality of receptacles (of the further structure), each have two opening.

A cross-section of a receptacle can have any shape that the skilled person deems suitable. For example, the shape can be circular, elliptical, triangular, a diamond shape, rectangular, a polygon (e.g., hexagonal) and irregularly shaped, or combinations thereof. For example, a first section of a receptacle may have a circular shape, whereas a further section of said receptacle has a diamond shape. The shape of the cross-section of a receptacle is the shape of a cross-section made perpendicular to a length of the receptacle. An opening of a receptacle can have any shape that the skilled person deems suitable. For example, the shape can be circular, elliptical, triangular, a diamond shape, rectangular, a polygon (e.g., hexagonal) and irregularly shaped. If a receptacle has two openings, these opening may have the same shape, or may have a different shape.

In a preferred aspect of the invention, the receptacles, of the first plurality of receptacles, have the same cross-sectional shape. In a preferred aspect of the invention, the receptacles, of the further plurality of receptacles, have the same cross-sectional shape. In one aspect of the invention, it is preferred that the receptacles, of the first plurality of receptacles, and the receptacles, of the further plurality of receptacles, have the same cross-sectional shape. In an alternative aspect of the invention, it is preferred that the receptacles, of the first plurality of receptacles, and the receptacles, of the further plurality of receptacles, have different same cross-sectional shapes.

A receptacle is preferably adapted and arranged to hold a container by a positive fit, or by a frictional fit, or by both, wherein a positive fit is particularly preferred. Preferably, the positive fit holds a container against the gravitational force if the receptacle is positioned upright. In one preferred embodiment, establishing a positive fit includes elastically deforming the receptacle.

If the first plurality of receptacles of the first structure are at least partially aligned with the further plurality of receptacles of the further structure, this should be understood to mean that at least one opening of a receptacle of the first plurality of receptacles at least partially overlaps with at least one opening of a receptacle of the further plurality of receptacles.

Protrusions

Protrusions preferably comprise a metal and/or at least one temperature resistant polymer. Examples of a preferred metal include stainless steel and a non-rusting steel. Here stainless steel is particularly preferred. A temperature resistant polymer should preferably be understood as a polymer that is resistant to damage when exposed to temperatures used for sterilisation of a structure, wherein said sterilisation is preferably performed using a gas and/or vapour (the sterilisation of a structure is often performed at a temperature of 121° C.). A preferred example of a temperature resistant polymer is polyether ether ketone (PEEK).

Protrusions are preferably formed as one piece with the further structure. If the further structure comprises an outer layer, the protrusions are preferably formed as one piece with the outer layer. In a preferred aspect of the invention, the protrusions extend in a direction that is substantially perpendicular to either the first surface, the further surface, or both the first surface and the further surface, of the further structure.

If a protrusion is at least partially received in the first structure, this should preferably be understood to mean that at least one section of the protrusion extends into the recess and/or opening and/or gap formed in the first structure when the first structure and the further structure are engaged.

A protrusion that is partially received in the first structure should preferably be understood to mean that a first section of the protrusion is located in a recess and/or opening and/or gap formed in the first structure, while a further section of the protrusion is not located in the first structure. A protrusion that is received in the first structure should preferably be understood to mean that no section of said protrusion is located outside a recess and/or opening and/or gap formed in the first structure.

If a protrusion is at least partially received in a receptacle, this should preferably be understood to mean that at least one section of the protrusion extends into the interiors of the receptacle when the first structure and the further structure are engaged.

A protrusion that is partially received in a receptacle should preferably be understood to mean that a first section of the protrusion is located in the interior of said receptacle, while a further section of the protrusion is not located in the interior of said receptacle. A protrusion that is received in a receptacle should preferably be understood to mean that no section of said protrusion is located outside the interior of said receptacle.

If a protrusion is at least partially received in a recess, this should preferably be understood to mean that at least one section of the protrusion is positioned in the recess when the first structure and the further structure are engaged.

A protrusion that is partially received in a recess should preferably be understood to mean that a first section of the protrusion is positioned in the recess, while a further section of the protrusion is not positioned in the recess. A protrusion that is received in a recess should preferably be understood to mean that no section of said protrusion is positioned outside of said recess.

Containers

A container as referred herein comprises a container wall at least partially enclosing an interior volume of said container. A container as referred to herein is designed to accommodate a composition in such a way that an inner side of the container wall (i.e., the side of the container wall which faces the interior volume) and/or a coating layer (e.g., lubrication layer) on the inner side of the container wall can be in direct contact with the composition. A preferred container is suitable to be used for accommodating a pharmaceutical and/or cosmetic composition. A preferred container may comprise at least one closing means at one or both ends of the container. An example of a closing means is a cap. An example of a container with a closing means are the syriQ® syringes with Rigid Cap (SRC), commercially available from SCHOTT Pharma AG & Co. KGaA.

A first end of a container preferably comprises a first orifice, which allows for the charging of a composition into the interior volume of the container. Preferably, the first orifice also allows for the discharging of a composition from the interior volume.

An interior volume of a container represents the full volume of the interior of the container. This volume may be determined by filling the interior volume with water up to the brim of the container and measuring the volume of the amount of water which the interior volume can take up to the brim. Hence, the interior volume as used herein is not a nominal volume as it is often referred to in the technical field of pharmacy. This nominal volume may for example be less than the interior volume by a factor of about 0.5.

A container according to the invention may have any size or shape which the skilled person deems appropriate in the context of the invention. A preferred container has at least one section that is cylindrical. A preferred container is elongated.

A preferred container, more preferably the container wall, comprises, more preferably consists of, at least one glass, at least one polymer, or a combination thereof. A glass may be any type of glass and may have any composition which the skilled person deems suitable in the context of the invention. Preferably, the glass is suitable for pharmaceutical compositions. A preferred glass is of type I in accordance with the definitions of glass types in section 3.2.1 of the European Pharmacopoeia, $7^{th}$ edition from 2011. Examples of a preferred glass include borosilicate glass, fused silica, and a combination thereof. A particularly preferred glass is a borosilicate glass. Examples of a preferred polymer include polypropylene, polyoxymethylene, polyethylene, a cyclic olefin copolymer (COC) and a cyclic olefin polymer (COP). Here a cyclic olefin copolymer (COC) and a cyclic olefin polymer (COP) are particularly preferred.

Examples of preferred containers include cartridges, vials, ampules, carpules, and syringes. Preferably, all of the containers, of the plurality of containers, are of the same type of container, which is preferably selected from the above-mentioned mentioned examples of preferred containers. A preferred syringe is made from glass or polymer. Additionally or alternatively, a preferred syringe has an interior volume in the range from 0.5 to 100 ml, preferably from 0.5 to 80 ml, more preferably from 0.5 to 60 ml. Additionally or alternatively, a preferred syringe comprises a body part which is preferably cylindrical. This is also referred to as barrel. A preferred barrel of a syringe has a diameter in the range from 5 to 50 mm, more preferably from 6 to 45 mm, even more preferably from 8 to 40 mm, most preferably from 9 to 35 mm. Particularly preferable, the barrel is made from a glass or a polymer.

A preferred container, more preferably the container wall, more preferably a surface of the container wall facing the interior volume of the container, comprises at least one coating layer. Here a coating layer should preferably be understood as a layer that is applied by any method known to a skilled person working in the pharmaceutical industry. These methods include the application of a coating layer by spraying or wiping said coating layer on the container wall facing the interior volume of the container. A preferred coating layer is a lubrication layer. A preferred lubrication layer comprises silicon. A preferred lubrication layer reduces friction when a component of the container is moved in the interior volume of the container. Here an example of a component is a plunger of a syringe, with the syringe being an example of a container. For example, a lubrication layer reduces the force required to move a plunger in a barrel of a syringe.

A preferred containers has a first section and a further section, wherein a diameter of the further section is larger than a diameter of the first section. Here it is preferred that the further section is a body of the container, and the further section is a closing means adapted and arranged to close the container. For example, the first section is a barrel of a syringe, and the further section is a cap of the syringe.

Pharmaceutical and Cosmetic Composition

In the context of the invention, every pharmaceutical composition and every cosmetic composition which the skilled person deems suitable comes into consideration. A pharmaceutical composition is a composition comprising at least one pharmaceutically active ingredient. A preferred pharmaceutically active ingredient is a vaccine. A cosmetic composition is a composition comprising at least one cosmetically active ingredient. A preferred cosmetically active ingredient is hyaluronic acid or botulinum toxin. The pharmaceutical and/or cosmetic composition may be fluid or solid or both, wherein a fluid composition is particularly preferred herein. A preferred solid composition is granular such as a powder, a multitude of tablets or a multitude of capsules. A further preferred pharmaceutical and/or cosmetic composition is a parenterialium, i.e., a composition which is intended to be administered via the parenteral route, which may be any route which is not enteral. Parenteral administration can be performed by injection, e.g. using a needle (usually a hypodermic needle) and a syringe, or by the insertion of an indwelling catheter.

Further Definitions

If the first structure and the further structure are adapted and arranged to be detachably engaged this should be understood to mean that the first structure and the further structure can be brought into contact with each other, and subsequently separated from each other, preferably without damaging the first structure, the further structure, or both the first structure and the further structure.

If the assembly, more preferably the first structure, is adapted and arranged for the first plurality of protrusions to be detachably received in the first structure, this should be understood to mean that the first plurality of protrusions can be received in the first structure, and subsequently removed from the first structure, preferably without damaging the first structure, the first plurality of protrusions, or both the first structure and the first plurality of protrusions.

If first structure and the further structure are detachably engaged, this should be understood to mean that the first structure and the further structure can be brought into contact with each other, and subsequently separated from each other, preferably without damaging the first structure, the further structure, or both the first structure and the further structure.

A lateral direction is defined to be parallel to the first surface of the further structure.

The invention is now illustrated by non-limiting examples and exemplifying embodiments.

BRIEF DESCRIPTION OF THE DRAWINGS

The figures serve to exemplify the present invention and should not be viewed as limiting the invention. Furthermore, the figures are not drawn to scale.

DESCRIPTION OF FIGURES

Figure 1:
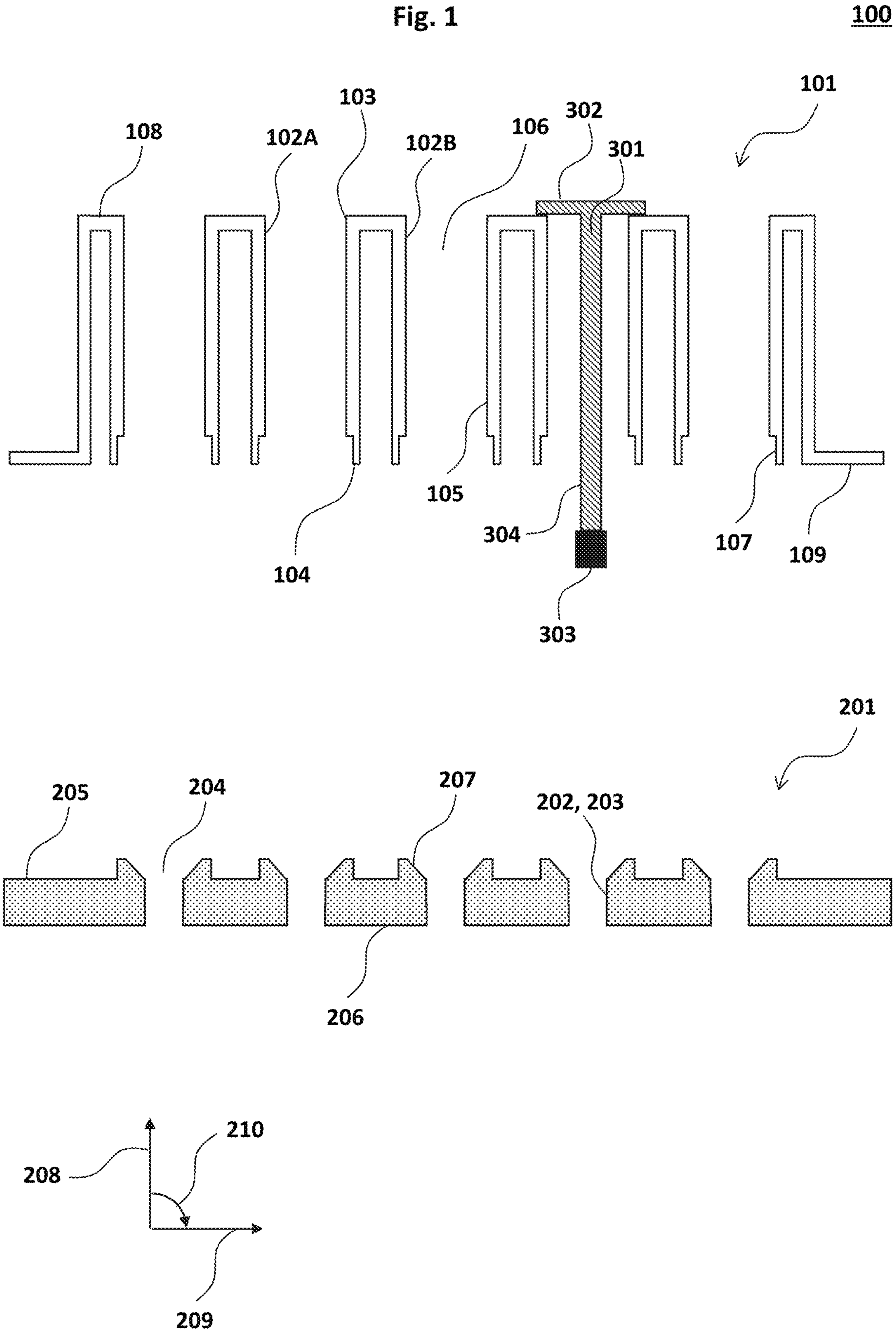
FIG. 1: schematic illustration of a cross-sectional cut of an assembly according to the invention.

FIG. 1 shows a schematic illustration of a cross-sectional cut of an assembly 100 according to the invention. The assembly comprises a first structure 101. The first structure 101 comprises a first plurality of receptacles, such as the receptacles 102A and 102B. A receptacle, of the first plurality of receptacles, has a first end 103 and a further end 104, wherein the further end 104 is opposite the first end 103. A receptacle, of the first plurality of receptacles, has a sidewall and an interior enclosed by said sidewall. For example, receptacle 102B has a sidewall 105 enclosing an interior 106. The sidewall of the receptacles of the first structure 101 also have recesses, such as 107, located at the further ends 104 of said receptacles. The first structure also has a first surface 108 and a further surface 109, opposite the first surface 108. In FIG. 1, the first surface 108 is a top surface, and the further surface 109 is a bottom surface.

FIG. 1 also shows the further structure 201 of the assembly 100. The further structure 201 comprises a further plurality of receptacles, such as 202. The receptacles of the further plurality of receptacles also have sidewalls, such as 203, and interiors 204 enclosed by said sidewalls. The further structure 201 has a first surface 205 and a further surface 206, opposite the first surface 205. In FIG. 1, the first surface 205 is a top surface, and the further surface 206 is a bottom surface. As shown in FIG. 1, the further structure 201 also has a first plurality of protrusions, such as protrusion 207, extending from the first surface 205. The protrusions are adapted and arranged to exert a force along a further direction 209 on containers (e.g., the further ends of the containers) when said containers are being inserted into the further structure 201. In other words, the protrusions allow for an improved positioning of the containers in the receptacles. The further direction 209 makes an angle $\alpha$ 210 with respect to a first direction 208, wherein said first direction 208 is perpendicular to the first surface 205 of the first structure. In FIG. 1, $\alpha$=90°, i.e., the protrusions are adapted and arranged to exert a force along a lateral direction during insertion of the containers into the further structure 201 when the containers are in contact with the protrusions.

The first plurality and further plurality of receptacles in FIG. 1 are also adapted and arranged for at least partially accommodating a plurality of containers. As shown in FIG. 1, a container 301 (in this case a syringe) is partially accommodated in a receptacle of the first structure 101. The container 301 has a first end 302, which in this case is a flange of the syringe, and a further end 303, which in this case is a cap of the syringe. The container 301 also has a barrel 304. A diameter of the barrel 304 is less than a diameter of the further end 303 (here diameter is measured along the further direction 209). A gap is thus formed between the barrel 304 of the container 301 and a sidewall of the receptacle wherein said container 301 is accommodated. This gap may be 0.5 mm, or even larger. As a result, the container 301 can move in the receptacle, accommodating said container, along the further direction 209. It is also possible for the container 301 to tilt in the receptacle accommodating container 301. The aforementioned gap may also be present, even if a receptacle, of the first plurality of receptacles, comprises projections (such as ribs) extending into an interior of said receptacle. The first end 302 and the further end 303 of the container 301 extend beyond the first structure. In other words, a length of the container 301 is longer than the lengths of the receptacles of the first structure 101. Here length is measured along the first direction 208. A diameter of the further end 303 and the barrel 304 of the container 301 is also less than a diameter of the receptacles of the first structure 101 (here diameter is measured along the further direction 209).

Figure 2:
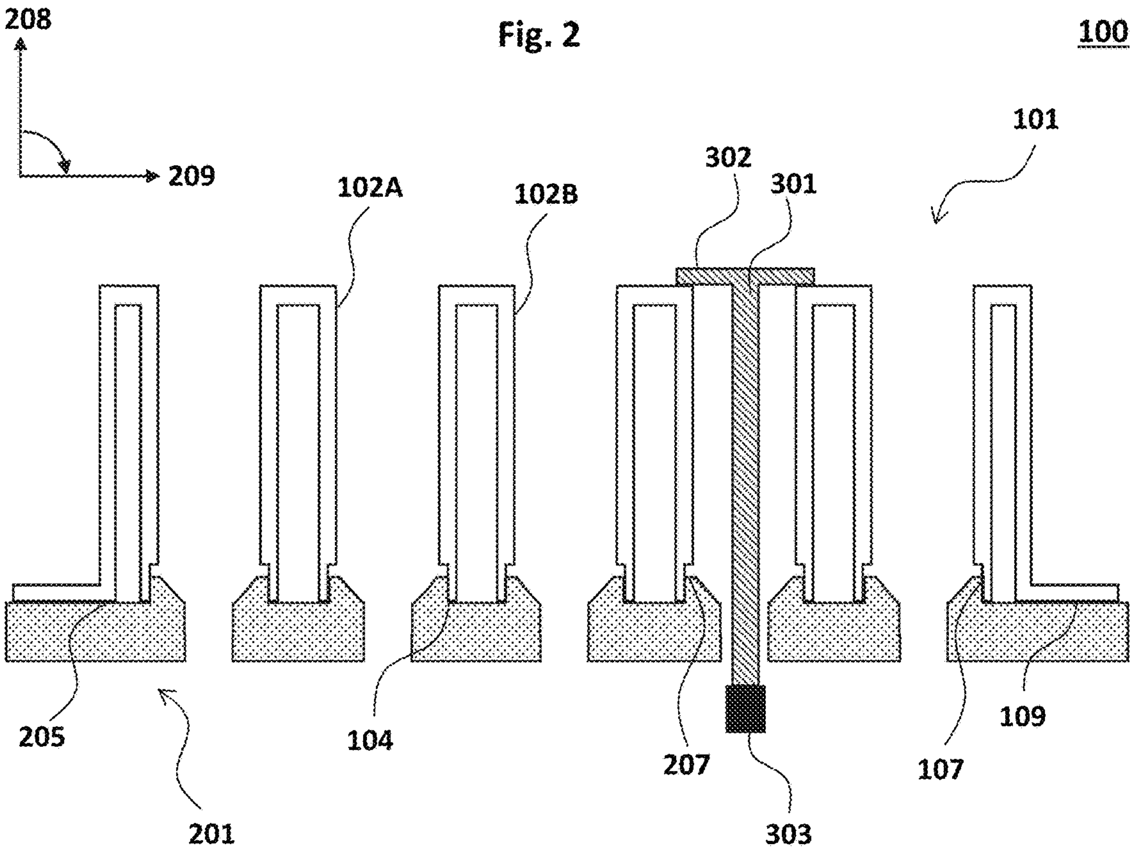
FIG. 2: schematic illustration of a cross-sectional cut of the assembly according to FIG. 1, wherein the first structure and the further structure are detachable engaged.

FIG. 2 is a schematic illustration of a cross-sectional cut of the assembly according to FIG. 1, wherein the first structure and the further structure are detachably engaged. The protrusions, such as 207, are received in the receptacles, of the first plurality of receptacles (such as 102A and 102B). More specifically, the protrusions are received in the recesses, such as recess 107, of the sidewalls of the receptacles, of the first plurality of receptacles. The further surface 109 of the first structure 101 also touches the first surface 205 of the further structure 201. Furthermore, the first ends, such as first end 104, of the receptacles of the first structure 101 touch the first surface 205 of the further structure. As a result, an average distance between the further ends of the first plurality of receptacles and the first surface 205 of the further structure 201 is 0 mm. The receptacles of the first structure 101 are also aligned with the receptacles of the further structure 201. When the first structure 101 and the further structure 201 are initially engaged, the protrusion 207 can exert a force on the further end 303 of the container 301 in the further direction 209 if, e.g., the container 301 is not centred in the receptacle of the first structure 101 and/or if the first plurality of receptacles is not aligned with the further plurality of receptacles. As a result, the protrusions 207 allow the containers 301 to be inserted more easily in the receptacles of the further structure 201. During the engagement of the first structure 101 and the further structure 201, the further structure 201 may be moved in an alternating fashion parallel to the further direction 209 (e.g., the further structure 201 is shaken).

Figure 3:
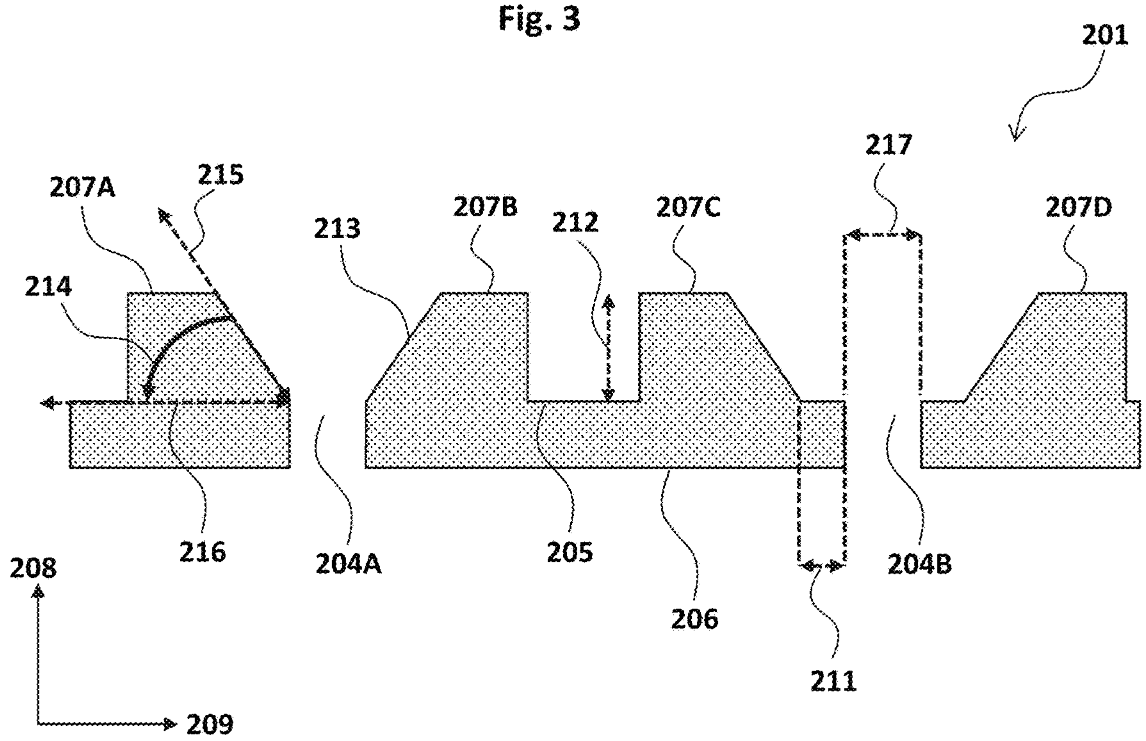
FIG. 3: schematic illustration showing how the dimensions and parameters of the protrusions are measured.

FIG. 3 is a schematic illustration showing how the dimensions and parameters of the protrusions are measured. The structure 201 has a first plurality of protrusions, such as 207A to 207D. Protrusions 207A and 207B are arranged around the circumference of the receptacle with interior 204A, while protrusions 207C and 207D are arranged around the circumference of the receptacle with interior 204B. The distance 211 is the distance between protrusion 207C and the circumference of the receptacle with interior 204B. This distance 211 is measured from the point on the protrusion 207C closest to the circumference. The height of a protrusion 212 is measured from the first surface 205 of the further structure 201 to the point on the protrusion furthest from said first surface 205. The height 212 is measured along the first direction 208, perpendicular to the first surface 205 of the further structure 201. FIG. 3 also shows that the protrusions have surfaces, such as 213, that are arranged at an angle β 214 with respect to the first surface 205 of the further structure 201. To determine the angle β 214, a first imaginary line 215 is drawn tangent to the surface 213, while a second imaginary line is drawn tangent to the first surface 205 of further structure 201. The angle enclosed by the imaginary lines 214 and 215 defines the angle β 214. FIG. 3 also shows how the diameter 217 of a receptacle of the further structure 201 is measured. The diameter 217 is measured parallel to the first surface 205. The diameter of a receptacle of the first structure is measured in the same manner.

Figure 4:
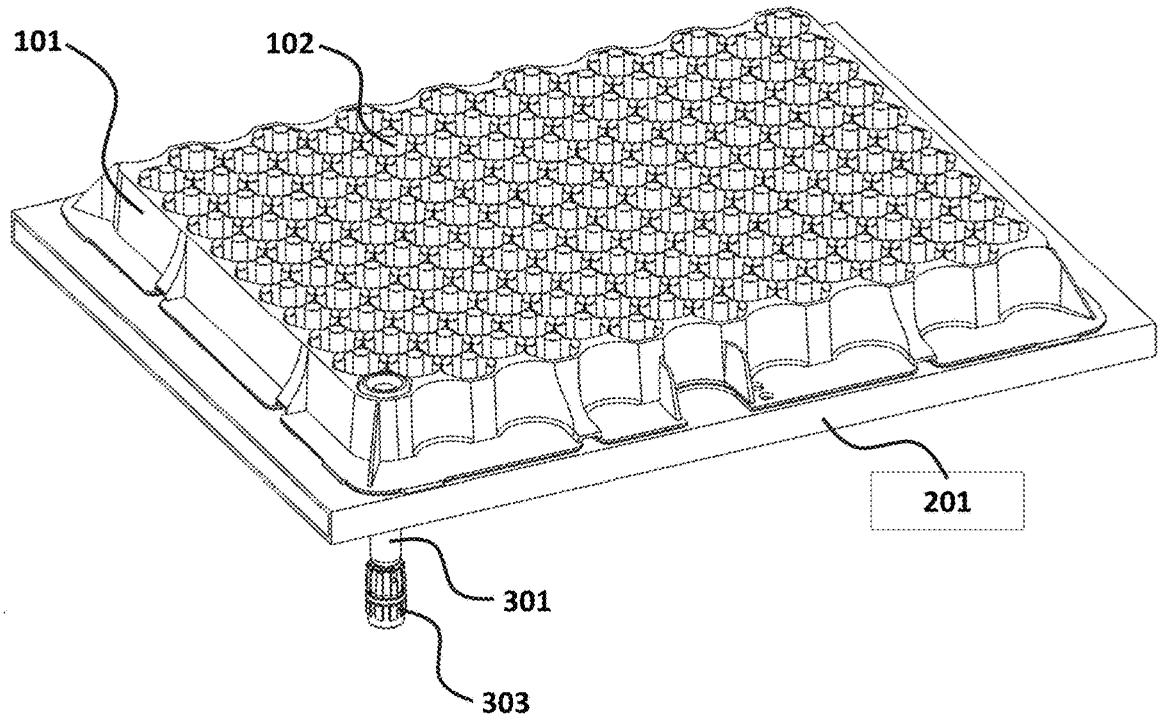
FIG. 4: schematic illustration showing an isometric view of an assembly according to the invention.

FIG. 4 is a schematic illustration showing an isometric view of an assembly according to the invention. In FIG. 4, the first structure 101 is detachable engaged with the further structure 201. FIG. 4 also shows a container 301 partially accommodated in the assembly, wherein a further end 303 of the container 301 extends below the assembly.

Figure 5:
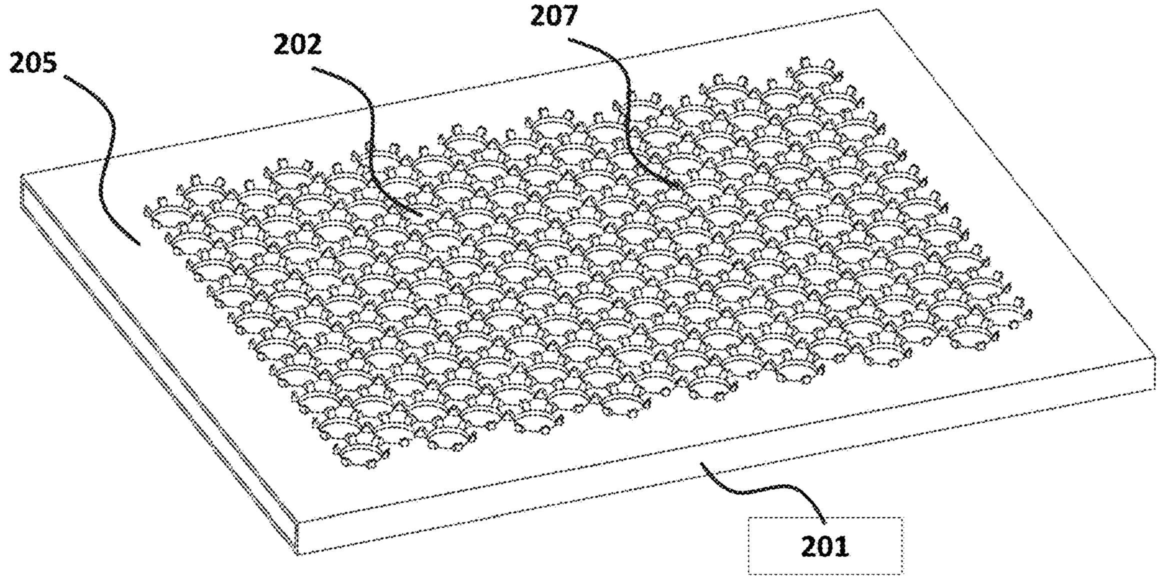
FIG. 5: schematic illustration showing an isometric view of a further structure according to the invention.

FIG. 5 is a schematic illustration showing an isometric view of a further structure 201 according to the invention. In FIG. 5, it can be seen how the first plurality of protrusions 207 are arranged around the circumferences of the further plurality of receptacles 202.

Figure 6:
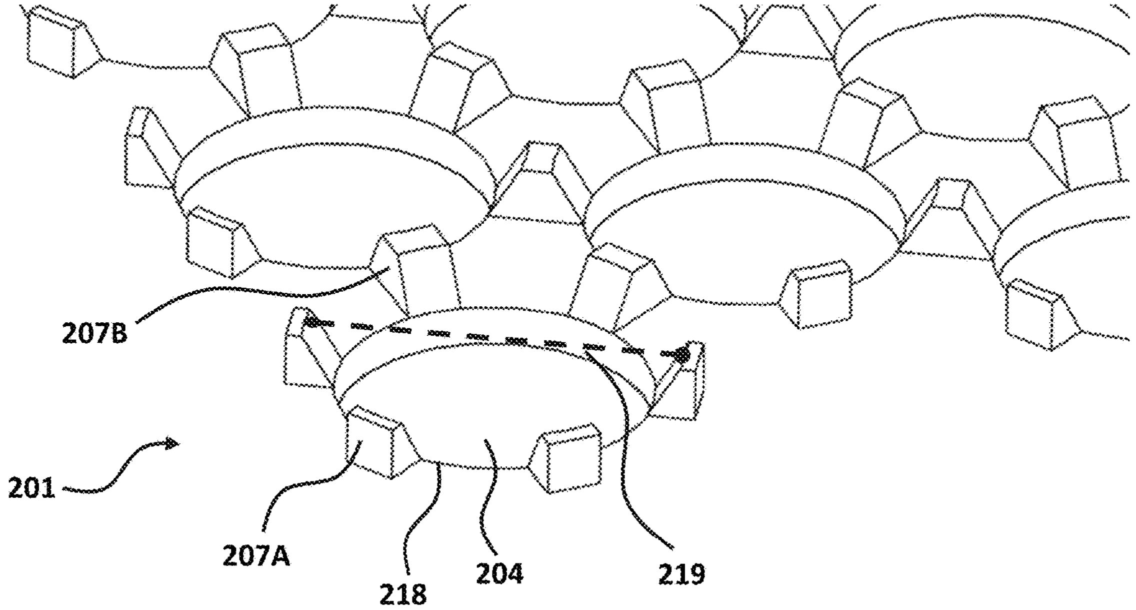
FIG. 6: enlargement of a section of the further structure showing protrusions.

FIG. 6 is an enlargement of a section of the further structure. In FIG. 6 it can be seen that a number of protrusions, of the first plurality of protrusions, are arranged around a circumference 218 of a receptacle of the further plurality of receptacles. It can also be seen that the protrusions do not all have the same shape, such as protrusion 207A and protrusion 207B. Protrusion 207A has a shape that may be described as a combination of a three-dimensional triangle and a cube. Protrusion 207B has a shape that may be described as a trapezoidal prism. FIG. 6 also shows how a diameter 219 of the protrusions, arranged around a circumference of a receptacle, is measured. As can be seen, the diameter 219 is defined as the maximum distance between two points, arranged on two different protrusions, wherein a third imaginary line connecting these two points passes through a fourth imaginary line. The third imaginary line is arranged perpendicular to the fourth imaginary line. The fourth imaginary line is arranged parallel to a length of the receptacle and passes through the centre of the receptacle.

Figure 7:
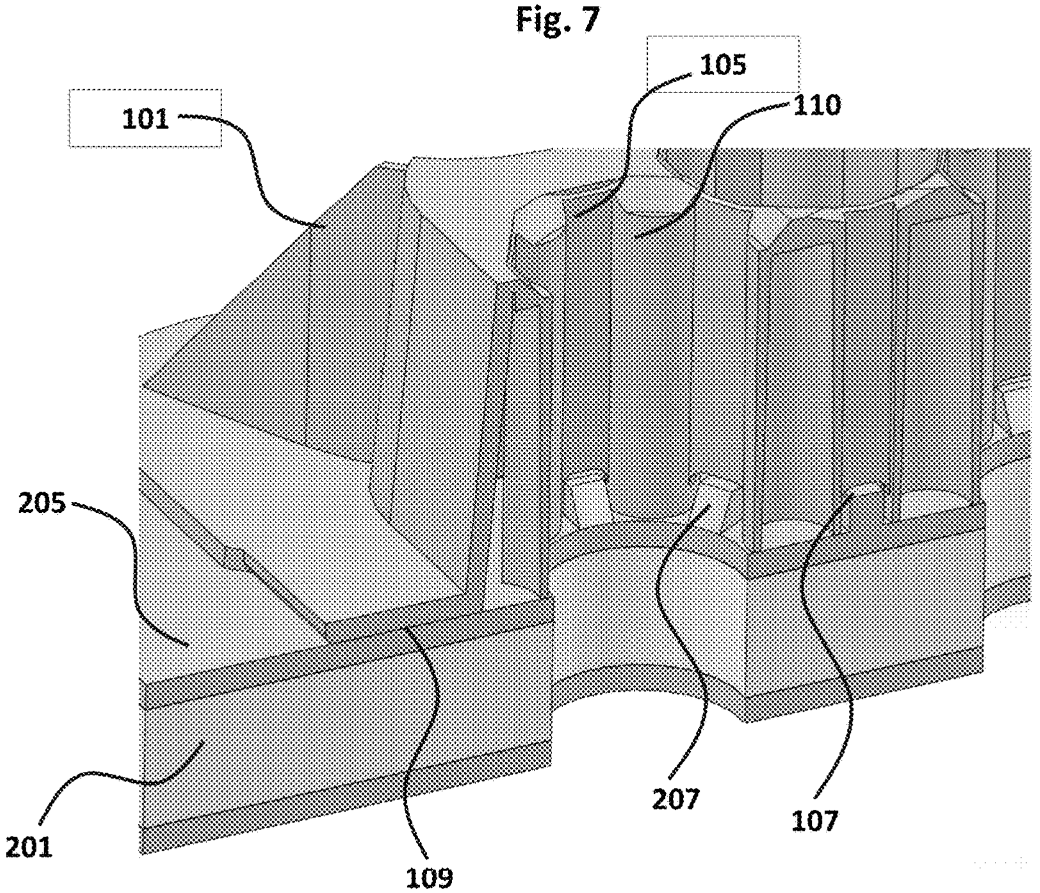
FIG. 7: enlargement of a section of the assembly showing the first structure detachably engaged with the further structure.

FIG. 7 is an enlargement of a section of the assembly showing the first structure 101 detachably engaged with the further structure 201. As shown in FIG. 7, the further surface 109 of the first structure 101 rests (touches) the first surface 205 of the further structure 201. It can also be seen that sections of the sidewall 105, of the receptacle of the first structure 101, rests on the first surface 205. The distance between the receptacle of the first structure 101 and the receptacle of the further structure 201 is thus 0 mm. FIG. 7 further shows that the sidewall 105 has recesses, such as recess 107. These recesses are adapted and arranged for receiving the protrusions, of the first plurality of protrusions, such as protrusion 207. It can also be seen that there is a gap between the top of the protrusions and the recesses. FIG. 7 further shows that the protrusions, such as 207, are partially received in the interior of the receptacles of the first structure. In other words, the protrusions extend into the interiors of the receptacles. The sidewalls 105 of the receptacles of the first structure also has protuberances 110 that extend into the interiors of the receptacles. It can also be seen in FIG. 7 that the protuberance 110 is arranged between the two protrusions, including protrusion 207. Such an arrangement allows a lateral movement of the first structure with respect to the further structure to be restricted.

Figure 8:
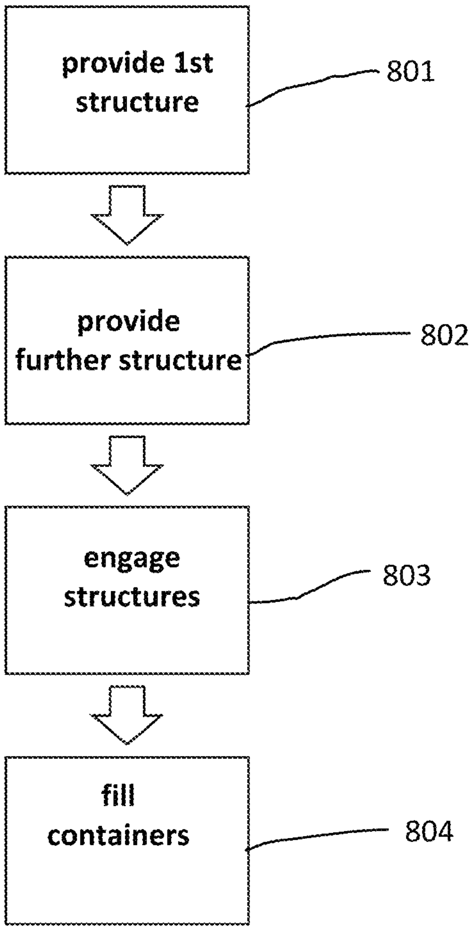
FIG. 8: flow diagram showing steps of a method, according to the invention, for filling a plurality of containers.

FIG. 8 is a flow diagram showing steps of a method, according to the invention, for filling a plurality of containers. In step 801, a first structure of an assembly, according to the invention, is provided. The first structure contains a plurality of containers partially accommodated in the first plurality of receptacles. In step 802, a further structure, of an assembly according to any of the invention, is provided. The further structure has a first plurality of protrusions extending from the first surface of the further structure. In step 803, the first structure and the further structure are detachably engaged by allowing the plurality of protrusions to be received in the first structure, thereby resulting in the plurality of containers at least partially accommodated in the further plurality of receptacles, and the first structure and the further structure touching each other. In step 804, the plurality of containers are partially filled with a pharmaceutical composition.

Figure 9:
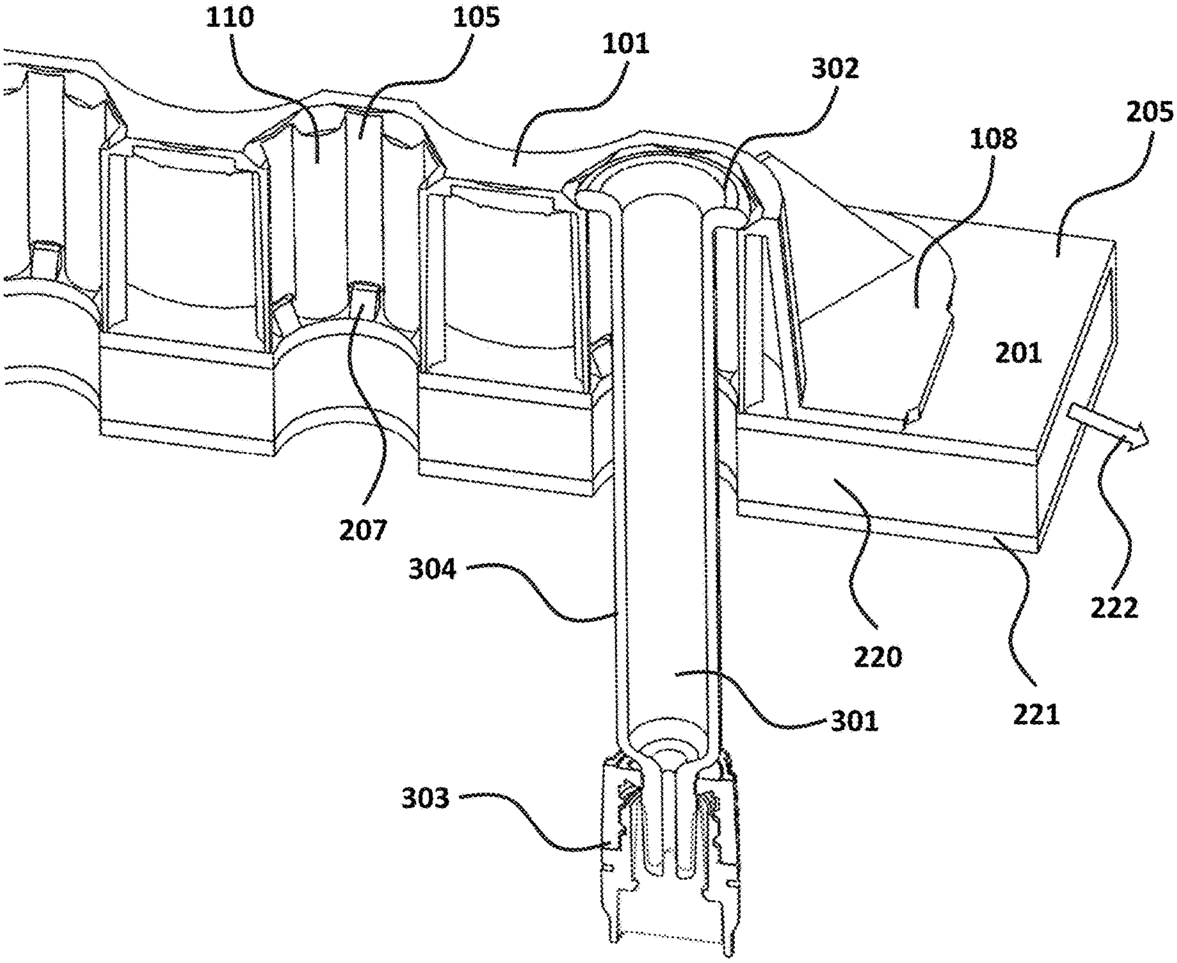
FIG. 9: schematic illustration of a cross-section of the assembly showing the first structure detachably engaged with the further structure.

FIG. 9 is a schematic illustration of a cross-section of the assembly showing the first structure detachably engaged with the further structure. FIG. 9 shows the same features as FIG. 7. In addition, FIG. 9 also shows a container 301 that is accommodated in the assembly. The container has a first end 302, a further end 303, and a barrel 304. It can be seen that the further end 303 has a larger diameter compared to a diameter of the barrel 304. FIG. 9 also shows that the further structure 201 has a core 220 and an outer layer 221 that partially surrounds the core 220. The core 220 is made from polyoxymethylene, while the outer layer 221 is made from stainless steel. The protrusions 207 are formed as one piece with the outer layer 221. The core 220 is also movable with respect to the outer layer 221 as indicated by the arrow 222 in FIG. 9 (the core can also be moved in a direction opposite to the direction 222). Moving the core 220 allows for a reduction in the diameters of the further plurality of receptacles of the further structure 201.

Figure 10:
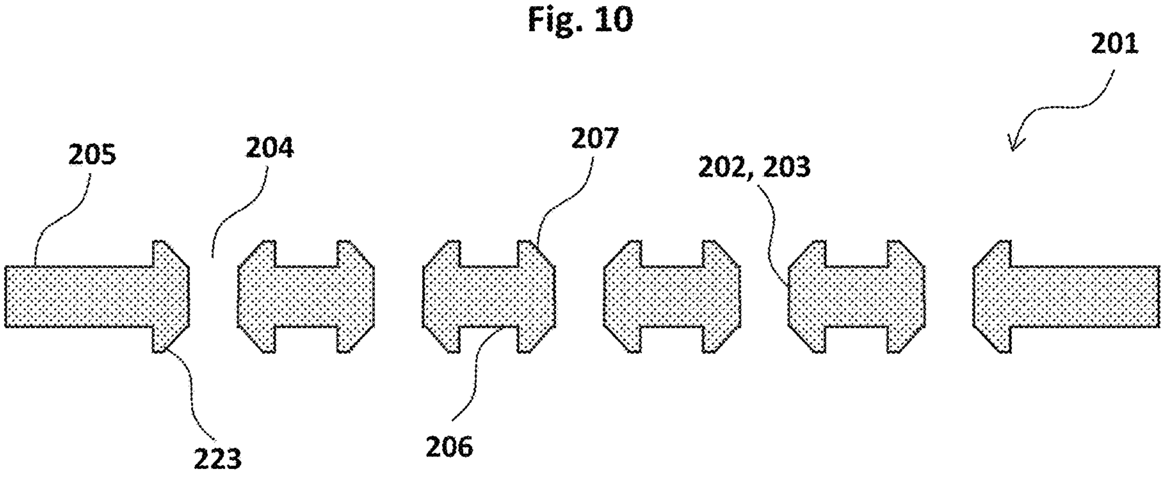
FIG. 10: schematic illustration of a cross-sectional cut of an alternative embodiment of a further structure according to the invention.

FIG. 10 is a schematic illustration of a cross-sectional cut of an alternative embodiment of a further structure. The further structure 201 in FIG. 10 is similar to the further structure 201 in FIG. 1. However, further structure 201 in FIG. 10 additionally has a further plurality of protrusions, such as protrusion 223, that extend from the further surface 206 of the further structure 201. This further plurality of protrusions facilitates a removal of the containers from the further structure during disengagement of the first structure and the further structure.

FIGS. 11A to 11D are schematic illustrations showing an alternative embodiment of a further structure and an even-further structure, both according to the invention. It should be noted that it is not required that the further structure and the even further structure shown in FIGS. 11A to 11D must be used in combination. FIGS. 11A to 11D show a preferred embodiment of the invention.

Figure 11A:
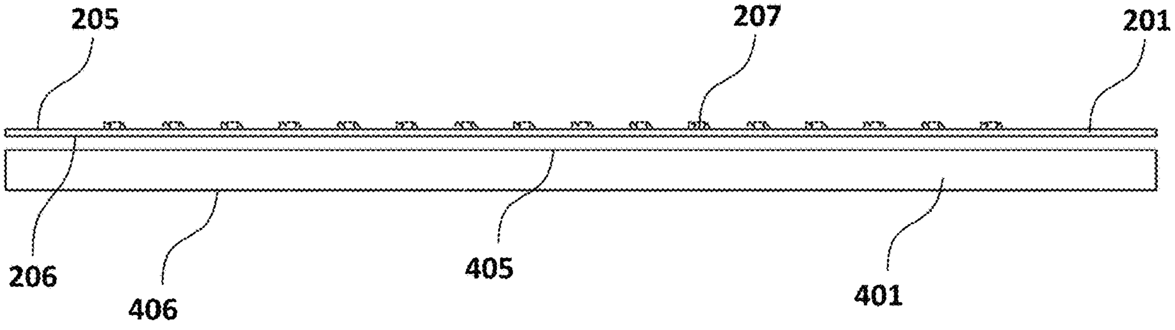
FIGS. 11A, 11B, 11C and 11D: schematic illustration of an alternative embodiment of a further structure and an even-further structure, both according to the invention.

FIG. 11A shows a schematic illustration of the further structure 201 and the even-further structure 401, viewed from the side. The further structure 201 has a first surface 205 and a further surface 206, with a plurality of protrusions 207 extending from the first surface 205. Similarly, the even-further structure 401 has a first surface 405 and a further surface 406. The first surface 405 of the even-further structure 401 is adapted and arranged for placing the further structure 201 on said first surface 405 (e.g., the first surface 405 is flat). Although not shown, the even-further structure 401 has a plurality of receptacles for partially accommodating a plurality of containers. The further structure 201 and the even-further structure 401 are adapted and arranged such that the receptacles of the further structure 201 and the receptacles of the even-further structure 401 at least partially align when the further structure 201 is placed on the first surface 405 of the even-further structure.

Figure 11B:
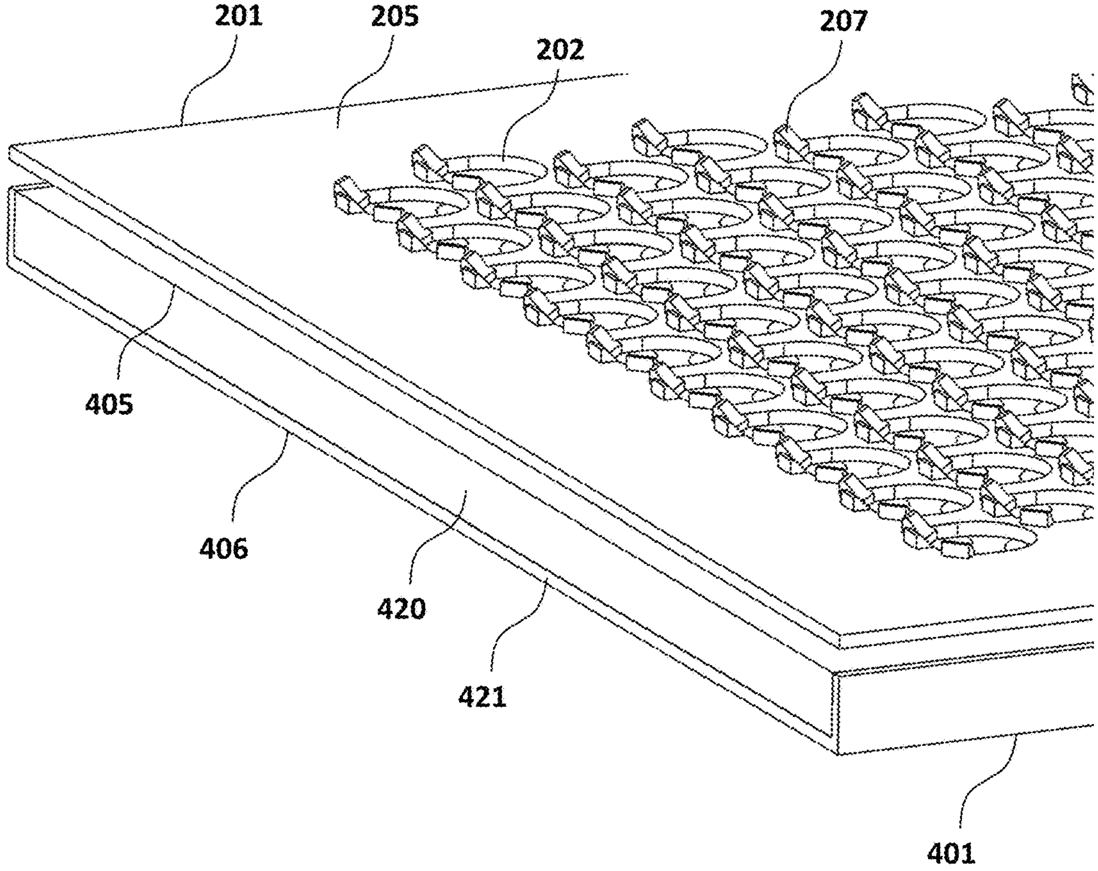

FIG. 11B is an isometric view of the further structure 201 and the even-further structure 401 shown in FIG. 11A, viewed from the side. It can be seen that the even-further structure 401 has a core 420 and an outer layer 421 that partially surrounds the core 420. The core 420 is made from polyoxymethylene, while the outer layer 421 is made from stainless steel. Furthermore, the first surface 405 is mostly formed by the core 420. As described for the core 220 of the further structure 201 in FIG. 9, the core 420 in FIG. 11B is movable with respect to the outer layer 421.

Figure 11C:
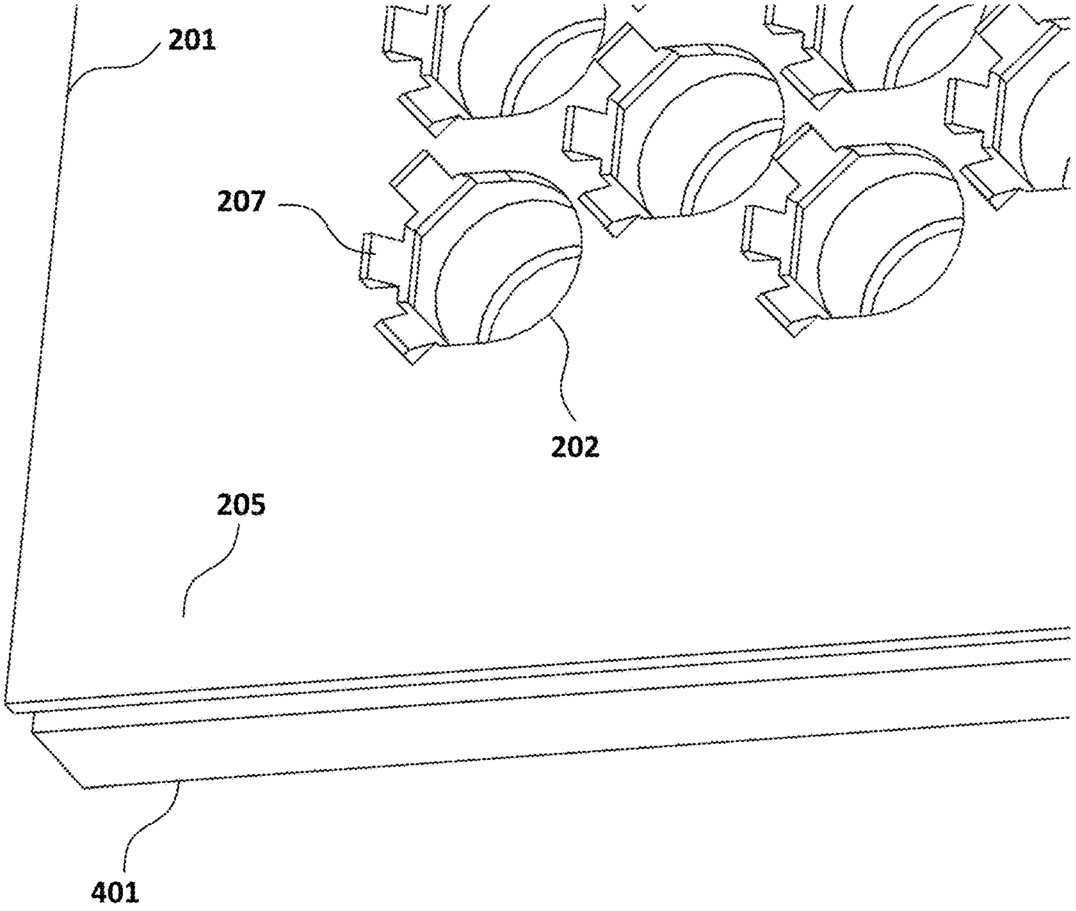
Figure 11D:
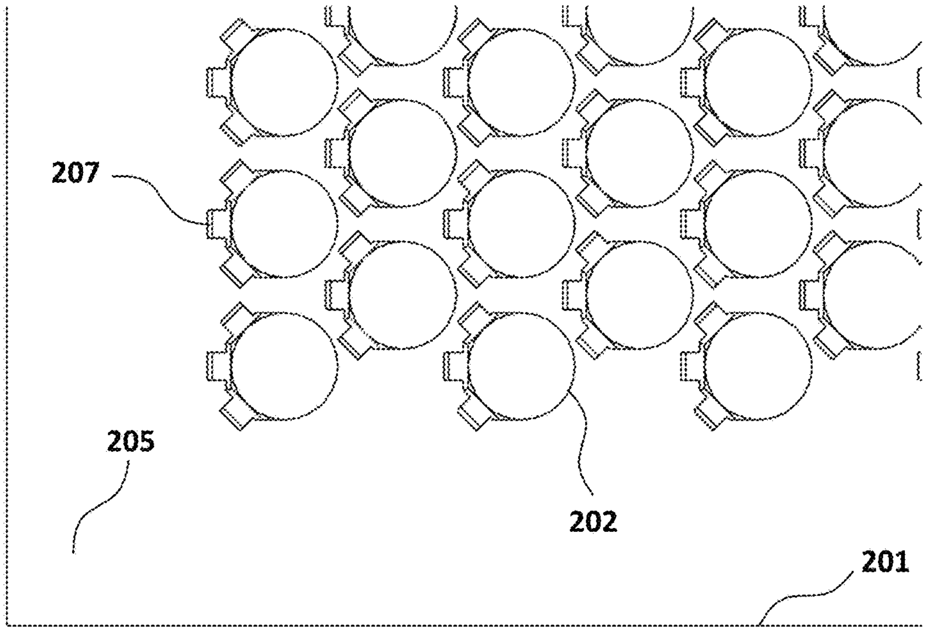

FIG. 11C is an isometric view of the further structure 201 and the even-further structure 401 shown in FIG. 11A, viewed from the side. Here it can be seen that the protrusions 207 are arranged only partially around the circumferences of the receptacles 202 of the further structure 201. FIG. 11D is a top view of the further structure 201 of FIG. 11A, also showing that the protrusions 207 are arranged only partially around the circumferences of the receptacles 202 of the further structure 201.

Test Methods

The test methods which follow were utilized within the context of the invention. Unless stated otherwise, the measurements were conducted at an ambient temperature of 23° C., an ambient air pressure of 100 kPa (0.986 atm) and a relative air humidity of 50%.

Average Distances

The average distance between the further ends of the first plurality of receptacles and the first surface of the further structure is determined as follows.

The first structure and the further structure are engaged. A section of a sidewall closest to the first surface of the further structure is identified for each receptacle of the first structure. The distance between said section and the first surface is measured along a distance that is perpendicular to the first surface. For example, FIG. 7 shows that the sidewall of the receptacle has sections that rest on the first surface of the further structure, as well has having a section with a recess. The distance is thus measured at the position of a section that rests on the first surface of the further structure. The distance is measured using a calliper.

The above procedure is repeated for each receptacle of the first plurality of receptacles to obtain a distance for each receptacle. An average distance is then calculated from these individual distances. This average distance is defined as the average distance between the further ends of the first plurality of receptacles and the first surface of the further structure. It is noted that the aforementioned distance is not measured between the further ends of the first plurality of receptacles and the first plurality of protrusions.

The average distance between the protrusions and the circumferences of the receptacles, of the further structure, is determined as follows. The distance between each of the protrusions and the receptacle, closest to a respective receptacle, is measured (see FIG. 3). The distance is measured using a calliper. An average is then calculated from the individual distances. This average distance defines the average distance between the protrusions and the circumferences of the receptacles, of the further structure.

The average diameter of the protrusions, when arranged around the circumferences of the receptacles, of the first plurality of receptacles, is determined as follows. The diameter is measured for each receptacle (i.e., for each set of protrusions arranged around a respective receptacle), as shown in FIG. 6 (see also accompanying figure description). The diameter is measured using a calliper. The average diameter is then determined from these individual measurements.

A distance between the further surface of the first structure and the first surface of the further structure is defined as the shortest distance between the aforementioned surfaces. It is noted that the aforementioned distance is not measured between the further surface of the first structure and the first plurality of protrusions.

An average distance between centres of neighbouring receptacles (of a plurality of receptacles) is determined by first measuring the distance between the centres of each pair of neighbouring receptacles of the plurality of receptacles. The average is then determined from these individual measurements.

Heights and Average Heights

A height of a structure is defined as the maximum distance between a first surface and a further surface of said structure.

The average height of the protrusions is determined by measuring the individual heights of the protrusions and determining an average from these measurements. A height of a protrusions is measured using a calliper.

Diameter of a Receptacle

A diameter of a receptacle is measured between the two points on a sidewall of the receptacle that are located closest to each other, wherein a line connecting said two points passes through the centre of the receptacle. If a receptacle comprises protuberances (or other structures) that extend into the interior of the receptacle (see, e.g., FIG. 7), the two closest points may be located on two protuberances (or the other structures). An example of other structures is a projection, such as a rib.

An average diameter of a plurality of receptacles is determined by measuring the diameter of each receptacle of said plurality of receptacles. The diameter is measured using a calliper. The average diameter is then calculated from the individual diameters.

Angles

Angles are measured using a protractor.

EXAMPLES

The invention is illustrated further by way of examples. The invention is not restricted to the examples.

Inventive Example 1.1

A first structure as shown in FIG. 1 is provided. The first structure has 140 receptacles (the first plurality of receptacles) that each hold a syringe (a container) such that the further ends of the containers protrude from the further ends of the receptacles (see FIG. 1). The height of the first structure is 19 mm. The further ends of the receptacles have a diameter that is larger than a diameter of the barrels.

The first structure (with the syringes) is located in a filling station that has filling needles for partially filling the syringes with a pharmaceutical composition. The filling needles are arranged above the first ends (see FIGS. 1 and 2) of the syringes.

A further structure, as shown in FIGS. 1 to 6, is then provided. The further structure also has 140 receptacles (the further plurality of receptacles). The height of the further structure is 10 mm. In addition, the further structure has a plurality of protrusions that extend from the first surface of the further structure (e.g., FIGS. 5 and 6). Each protrusion comprises at least one surface that makes an angle β=50° with the first surface of the further structure. The average height of the protrusions is 2 mm.

The first structure and the further structure are subsequently detachably engaged (as in, e.g., FIGS. 2, 5 and 7). As a result, the syringes are partially accommodated in the receptacles of the first structure and the further structure. Due to the presence of the protrusions, the syringes are guided towards the centres of the interiors of the first and further plurality of receptacles (the protrusions exert a force in the lateral direction on the syringes) during engagement of the first and further structures. The protrusions also aid in positioning the first and further structures with respect to each other, while simultaneously restricting a lateral movement of the first structure with respect to the further structure.

Once the first and further structures are detachably engaged, the syringes are filled with the pharmaceutical composition. The first and further structures are then disengaged, and the first structure with the partially filled syringes is transported away from the filling station.

Inventive Example 1.2

Inventive example 1.2 is the same as example 1.1, with the following difference. In addition to the protrusions that extend from the first surface of the further structure, the further structure also has protrusions that extend from the further surface of the further structure (see FIG. 10). These protrusions that extend from the further surface also comprises at least one surface that makes an angle β=50° with the further surface of the further structure. The average height of these additional protrusions is also 2 mm. Furthermore, similar to the protrusions that extend from the first surface, the protrusions that extend from the further surface are arranged around the circumferences of the further plurality of receptacles.

Comparative Examples 1.3 and 1.4

The examples are performed as described for example 1.1, with the following differences. In example 1.3, the further structure does not have any protrusions. In example 1.4, a further structure is not provided and used during the filling of the syringes.

Table 1 below shows a comparison of technical effects between examples 1.1 to 1.4.

TABLE 1

| | 1.1 | 1.2 | 1.3 | 1.4 |
|---|---|---|---|---|
| Set-up | | | | |
| Further structure | Protrusions on first surface | Protrusions on first surface and further surface | No protrusions | Not present |
| Technical effects | | | | |
| Insertion of syringes | ++++ | ++++ | ++ | −−− |
| Reducing tilt of syringes | ++++ | ++++ | + | −− |
| Stability of assembly | ++ | ++ | −− | −−− |
| Filling speed | ++ | ++ | + | + |
| Reducing loss of composition during filling | ++++ | ++++ | + | −− |
| Tolerance of positioning of filling needles | +++ | +++ | + | −− |
| Reducing impurities in composition | +++ | +++ | + | − |
| Ease of removal of syringes after filling | + | +++ | + | Not applicable |
| Reducing loss of composition during removal of syringes after filling | + | ++ | + | Not applicable. |

The technical effects in Table 1 are as follows:

Insertion of syringes: how easily the syringes can be inserted in the interiors of the further plurality of receptacles (of the further structure) during engagement of the first structure and the further structure. A "+" indicates that the syringes can be inserted more easily, while a "−" indicates that it is less easy to insert the syringes. It is desired to increase the case of insertion.

Reducing tilt of syringes: how well the syringes are kept upright in the assembly during insertion of syringes into the further structure. A "+" indicates less tilt, while a "−" indicates more tilt. It is desired to reduce the tilt.

Stability of assembly: the structural stability of the assembly, i.e., how well the assembly can resist deformation forces. A "+" indicates a higher stability, while a "−" indicates less stability. A higher stability is desired.

Filling speed: the speed at which the syringes can be filled. A "+" indicates a larger filling speed, while a "−" indicates a slower filling speed. A larger filling speed is desired.

Reducing loss of composition during filling: during filling of the syringes with the pharmaceutical composition, some of said composition will be lost due to an imprecise positioning of the syringes in the assembly. A "+" indicates that less composition is lost, while a "−" indicates that more composition is lost. It is desired to reduce the loss of the composition.

Tolerance of positioning of filling needles: how precisely the filling needles have to be positioned to obtain a minimum loss of the composition during the filling of the syringes. A "+" indicates that there is a larger tolerance possible without increasing a loss of the composition. A "−" indicates that the tolerance is smaller. A larger tolerance is desired.

Reducing impurities in the composition: the filling of the syringes with the pharmaceutical composition can lead to the introductions of impurities into the interior volume of the syringes. A "+" indicates that less impurities are introduced, while a "–" indicates that more impurities are introduced. It is desired to reduce the impurities introduced.

Ease of removal of syringes after filling: how easily the syringes can be removed from the further structure after being filled (when the first and further structures are disengaged). The syringes can be removed more easily when, e.g., less force is required. A "+" indicates that it is easier to remove the syringes, while a "–" indicates that it is more difficult to remove the syringes. It is desired to increase the ease of removal.

Reducing loss of composition during removal of syringes after filling: the amount of composition that is lost when the first and further structures are disengaged. A "+" indicates that the loss of composition is reduced, while a "–" indicates that the more composition is lost. It is desired to reduce the loss in composition.

Inventive Examples 2

Example 1.1 is repeated using different protrusions. In particular, the angle α that the at least one surface of each protrusion makes with the first surface of the further structure is varied, as shown in Table 2 below. In example 2.4, the angle of 90° should be understood to mean that the protrusions for this specific example have the shape of a cube.

TABLE 2

| | 1.1 | 2.1 | 2.2 | 2.3 | 2.4 |
|---|---|---|---|---|---|
| Set-up | | | | | |
| β [°] | 50 | 10 | 30 | 70 | 90 |
| Technical effects | | | | | |
| Reduction in damage during engagement | +++ | –– | + | ++ | –– |
| Usability for syringes with varying diameter | +++ | + | ++ | ++ | – |
| Insertion of syringes | ++++ | + | +++ | ++ | –––– |
| Reducing tilt of syringes | +++ | – | + | +++ | ++++ |
| Reducing loss of composition during filling | +++ | + | ++ | ++++ | –– |
| Tolerance of positioning of filling needles | +++ | + | ++ | +++ | +++ |

The technical effects in Table 2 are the same as described in Table 1. In addition, Table 2 has the following technical effects:

Reduction in damage during engagement: the engagement of the first structure and the further structure may cause damage to the containers accommodated therein. A "+" indicates that less damage occurs, while a "–" indicates that more damage occurs. It is desired to reduce the damage that may occur.

Usability for syringes with varying diameter: whether the assembly can be used for syringes that have a varying diameter (e.g., syringes with caps that have a larger diameter than the diameter of the syringe barrels). A "+" indicates that the assembly allows it to be used for syringes that have a large variation in diameter. A "–" indicates that the assembly can only be used for syringes with a small or no variation in diameter. It is desired that the assembly can be used for syringes with a larger variation in diameter.

REFERENCE LIST

100 Assembly
101 First structure
102 Receptacles of the first plurality of receptacles
103 First end of receptacle of first plurality of receptacles
104 Further end of first plurality of receptacles
105 Sidewall of receptacle, of first plurality of receptacles
106 Interior of receptacle, of first plurality of receptacles
107 Recess in sidewall of receptacle, of first plurality of receptacles
108 First surface of first structure
109 Further surface of first structure
110 Protuberance
201 Further structure
202 Receptacles of further plurality of receptacles
203 Sidewall of receptacle, of further plurality of receptacles
204 Interior of receptacle, of further plurality of receptacles
205 First surface of further structure
206 Further surface of further structure
207 Protrusion of the first plurality of protrusions
208 First direction
209 Further direction
210 Angle α between first direction and further direction
211 Distance between protrusion and receptacle
212 Height of protrusion
213 Surface arranged at angle with first surface of further structure
214 Inclination angle β
215 First imaginary line
216 Second imaginary line
217 Diameter of receptacle of further structure
218 Circumference of receptacle of further plurality of receptacles
219 Diameter of protrusions arranged around circumference of receptacle
220 Core of further structure
221 Outer layer of further structure
222 Direction that core can be moved in
223 Protrusion of the further plurality of protrusions
301 Container
302 First end of container
303 Further end of container
304 Barrel
401 Even-further structure
405 First surface of even-further structure
406 Further surface of even-further structure
420 Core of even-further structure
421 Outer layer of even-further structure

What is claimed is:

1. An assembly comprising:

a first structure and a further structure, wherein a. the first structure comprises a first plurality of receptacles i. that are adapted and arranged for at least partially accommodating a plurality of containers, ii. that have a first end and a further end, opposite the first end;

b. the further structure
   i. comprises a further plurality of receptacles that are adapted and arranged for at least partially accommodating the plurality of containers,
   ii. has a first surface and a further surface, opposite the first surface,
   iii. comprises
      A. either a first plurality of protrusions extending from the first surface, or a further plurality of protrusions extending from the further surface, or both,
      B. wherein the first plurality of protrusions, the further plurality of protrusions, or both, are adapted and arranged to exert a force along a further direction on the containers when said containers are being inserted into and/or removed from the further structure along a first direction, wherein
         I. the first direction is perpendicular to the first surface of the further structure, and
         II. an angle $\alpha$ between the first direction and the further direction is such that $\alpha>0°$;
c. the first structure and the further structure are adapted and arranged to be positioned such that
   i. an average distance between the further ends of the first plurality of receptacles and the first surface of the further structure is less than 5 cm, and
   ii. the first plurality of receptacles is at least partially aligned with the further plurality of receptacles.

2. The assembly as recited in claim 1 wherein the first structure and the further structure are adapted and arranged to be detachably engaged.

3. The assembly as recited in claim 1 wherein the angle $\alpha$ is in the range from 20° to 170°.

4. The assembly as recited in claim 1 wherein the assembly comprises the first plurality of protrusions extending from the first surface of the first structure, and wherein the first structure and the further structure
   a. are adapted and arranged for the protrusions to be at least partially received in the first structure,
   wherein, if the protrusions are at least partially received in the first structure, the first plurality of receptacles are at least partially aligned with the further plurality of receptacles.

5. The assembly as recited in claim 4 wherein the further surface comprises a plurality of recesses adapted and arranged for at least partially receiving the first plurality of protrusions.

6. The assembly as recited in claim 5 wherein the recesses are formed in sidewalls of the first plurality of receptacles.

7. The assembly as recited in claim 4 wherein the assembly is adapted and arranged for the first plurality of protrusions to be at least partially received in the first plurality of receptacles.

8. The assembly as recited in claim 4 wherein the first plurality of protrusions is adapted and arranged to constrain a movement of the first structure in at least one dimension.

9. The assembly as recited in claim 1 wherein each receptacle of the further plurality of receptacles has in the range from 2 to 12 protrusions arranged around a circumference.

10. The assembly as recited in claim 1 wherein the first plurality of protrusions, or the further plurality of protrusions, or both, comprise surfaces arranged at an angle $\beta$ with respect to the first surface of the further structure, wherein said angle $\beta$ is less than 90°.

11. The assembly as recited in claim 1 further comprising a plurality of containers each containing less than 0.1 ml of a composition.

12. The assembly as recited in claim 1 further comprising a plurality of containers at least 20% filled with a composition.

13. A method for at least partially filling a plurality of containers, comprising the steps of
   a. providing a first structure of the assembly as recited in claim 1, with a plurality of containers at least partially received in the first plurality of receptacles;
   b. providing the further structure;
   c. engaging the first structure and the further structure, thereby resulting in
      i. the plurality of containers at least partially received in the further plurality of receptacles, and
      ii. an average distance between the further ends of the first plurality of receptacles and the first surface of the further structure being less than 5 cm; and
   d. at least partially filling the containers.

14. A plurality of containers at least partially filed with a composition, obtained according to the method as recited in claim 13.

* * * * *